US012657542B2

(12) United States Patent
Woods et al.

(10) Patent No.: US 12,657,542 B2
(45) Date of Patent: Jun. 16, 2026

(54) COMPUTING PLATFORM AND METHOD FOR PREDICTING CONSTRUCTION PROJECT PERFORMANCE BASED ON USAGE OF A CONSTRUCTION MANAGEMENT SOFTWARE APPLICATION

(71) Applicant: Procore Technologies, Inc., Carpinteria, CA (US)

(72) Inventors: Jeremiah Woods, Cincinnati, OH (US); Asad Lalani, Houston, TX (US); Catherine Knuff, Brooklyn, NY (US)

(73) Assignee: Procore Technologies, Inc., Carpinteria, CA (US)

( * ) Notice: Subject to any disclaimer, the term of this patent is extended or adjusted under 35 U.S.C. 154(b) by 0 days.

(21) Appl. No.: 18/753,278

(22) Filed: Jun. 25, 2024

(65) Prior Publication Data

US 2025/0390826 A1    Dec. 25, 2025

(51) Int. Cl.
*G06Q 10/0639*    (2023.01)
*G06Q 50/08*    (2012.01)

(52) U.S. Cl.
CPC ......... *G06Q 10/0639* (2013.01); *G06Q 50/08* (2013.01)

(58) Field of Classification Search
None
See application file for complete search history.

(56) References Cited

U.S. PATENT DOCUMENTS

| 5,823,781 A | 10/1998 | Hitchcok et al. |
| 11,507,908 B2 | 11/2022 | Singh et al. |
| 2015/0379428 A1* | 12/2015 | Dirac ..................... G06N 20/00 |
| | | 706/12 |
| 2016/0034822 A1 | 2/2016 | Mariano et al. |

FOREIGN PATENT DOCUMENTS

| WO | 2000/073958 A2 | 12/2000 | |
| WO | WO-2024152019 A1 * | 7/2024 | ......... G06F 21/6218 |

OTHER PUBLICATIONS

Browniee, Jason, "How to use quantile transforms for machine learning", https://machinelearningmastery.com/quantile-transforms-for-machine-learning/, Aug. 28, 2020 (Year: 2020).*
(Continued)

*Primary Examiner* — George Chen
(74) *Attorney, Agent, or Firm* — Lee Sullivan Shea & Smith LLP

(57) ABSTRACT
A computing system is configured to: (i) create a data science model that is configured to (a) receive a value for a metric that provides insight regarding a party's usage of a software tool of a construction management software application on a construction project and (b) based on an evaluation of the received value for the metric, output a prediction of the party's performance on the construction project and, (ii) after creating the data science model, utilize the data science model to produce a prediction of a given party's performance on a given construction project by inputting a given value for the metric into the data science model and thereby causing the data science model to (a) evaluate the given value of the metric, and (b) based on the evaluation, output the prediction of performance on the given construction project.

20 Claims, 19 Drawing Sheets

(56)           References Cited

OTHER PUBLICATIONS

Abioye, Sofiat O. et al., "Artificial Intelligence in the Construction Industry: A Review of Present Status, Opportunities and Future Challenges", Journal of Building Engineering, vol. 44, Oct. 5, 2021, 13 pages.
Guillaume-Joseph, Gina, Improving Software Project Outcomes Through Predictive Analytics: Part 2: IEEE Engineering Management Review, vol. 43, No. 3, 2015. Abstract.

* cited by examiner

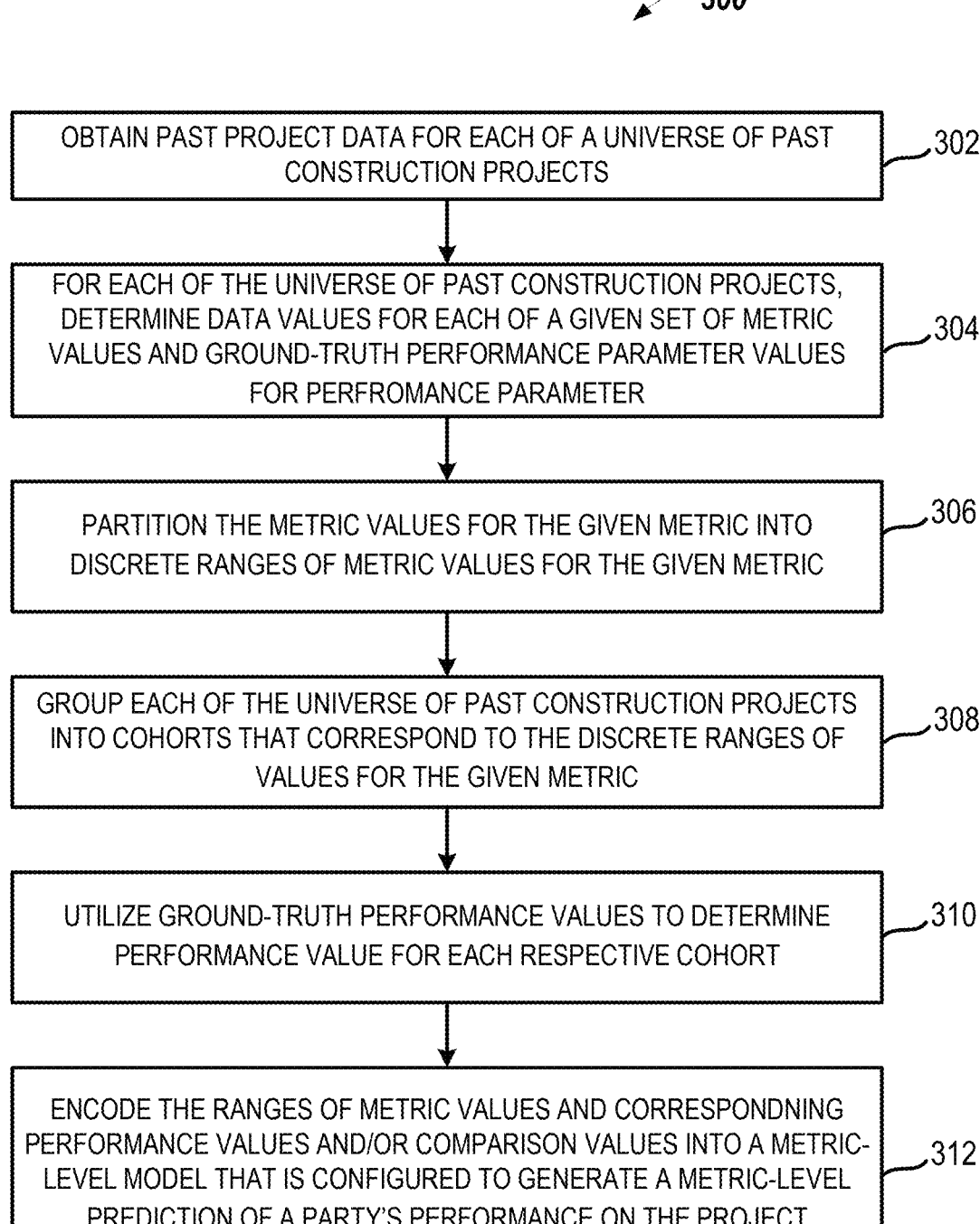

*300*

OBTAIN PAST PROJECT DATA FOR EACH OF A UNIVERSE OF PAST CONSTRUCTION PROJECTS — 302

FOR EACH OF THE UNIVERSE OF PAST CONSTRUCTION PROJECTS, DETERMINE DATA VALUES FOR EACH OF A GIVEN SET OF METRIC VALUES AND GROUND-TRUTH PERFORMANCE PARAMETER VALUES FOR PERFROMANCE PARAMETER — 304

PARTITION THE METRIC VALUES FOR THE GIVEN METRIC INTO DISCRETE RANGES OF METRIC VALUES FOR THE GIVEN METRIC — 306

GROUP EACH OF THE UNIVERSE OF PAST CONSTRUCTION PROJECTS INTO COHORTS THAT CORRESPOND TO THE DISCRETE RANGES OF VALUES FOR THE GIVEN METRIC — 308

UTILIZE GROUND-TRUTH PERFORMANCE VALUES TO DETERMINE PERFORMANCE VALUE FOR EACH RESPECTIVE COHORT — 310

ENCODE THE RANGES OF METRIC VALUES AND CORRESPONDNING PERFORMANCE VALUES AND/OR COMPARISON VALUES INTO A METRIC-LEVEL MODEL THAT IS CONFIGURED TO GENERATE A METRIC-LEVEL PREDICTION OF A PARTY'S PERFORMANCE ON THE PROJECT — 312

| PRODUCT | TOOL | METRIC | METRIC DESCRIPTION |
|---|---|---|---|
| Project Management | Daily Logs | Usage Rate | How frequently daily logs entries are created using Daily Logs |
| Project Management | Daily Logs | Character Count | Number of characters in a text field of a entries via Daily Logs |
| Project Management | Daily Logs | Days To Create | Number of days between a logged activity and when an associated Daily Log is generated |
| Project Management | RFIs | Usage Rate | How frequently is the RFIs tool used on a given project |
| Project Management | RFIs | Lead Time | How many days a party is given to complete an RFI task |
| Project Management | RFIs | %Closed Late | Percentage of RFIs that are closed later than a due date for an RFI |
| Project Management | RFIs | %With Cost Estimate | Percentage of RFIs that include a cost estimate associated with the RFI |
| Project Management | RFIs | %With Schedule Estimate | Percentage of RFIs that include a scheduling estimate associated with the RFI |
| Project Management | RFIs | %type is [TYPE] | Percentage of RFIs of a given TYPE (e.g., unknown, lowest, high risk, coordination issue, etc.) |
| Quality and Safety | Inspections | Usage Rate | How frequently inspections logs are created using Inspections |
| Quality and Safety | Inspections | Attachment Rate | Rate at which party provides an attachment with inspection logs |
| Quality and Safety | Inspections | Inspection Time | Average time it takes for a party to complete an inspection using Inspections |
| Quality and Safety | Observations | Usage Rate | How frequently observations entries are created using Observations |
| Quality and Safety | Observations | Time to Close | Time between an logged observation record and resolution of observation record |
| Quality and Safety | Observations | Lead Time | Average time it takes to close an observation record |
| Quality and Safety | Observations | %Late | Percentage of observation requests that are received late |
| Quality and Safety | Observations | %HAVING A CONDITION | Percentage of observations w/ a condition (e.g., checklist, hazard, condition, behavior incident, etc.) |
| Quality and Safety | Observations | %Priority is [LEVEL] | Percentage of observations where priority is at a level (e.g., low, medium urgent, etc.) |
| Quality and Safety | Observations | %Type is [TYPE] | Percentage of observations having a type (e.g., corrective, deficiency, prepunch, work, etc.) |
| Finance | Invoices | Usage Rate | How frequently invoices are created using Invoices |
| Finance | Invoices | %of Project Invoiced | Percentage of work on a project invoiced using Invoices |
| Finance | Invoices | %Approved | Percentage of invoices that are approved via using Invoices |
| Finance | Invoices | %Having Attachments | Percentage of payment requests including attachments |
| Finance | Payments | Usage Rate | How frequently payments are made are created using Payments |
| Finance | Payments | %of Project Paid w/ Payments | Percentage of payments are made using Payments |
| Finance | Payments | %Having Attachments | Percentage of payment requests including attachments |
| Finance | Payments | %Pay Method Published | Percentage of payments wherever pay method is recorded |

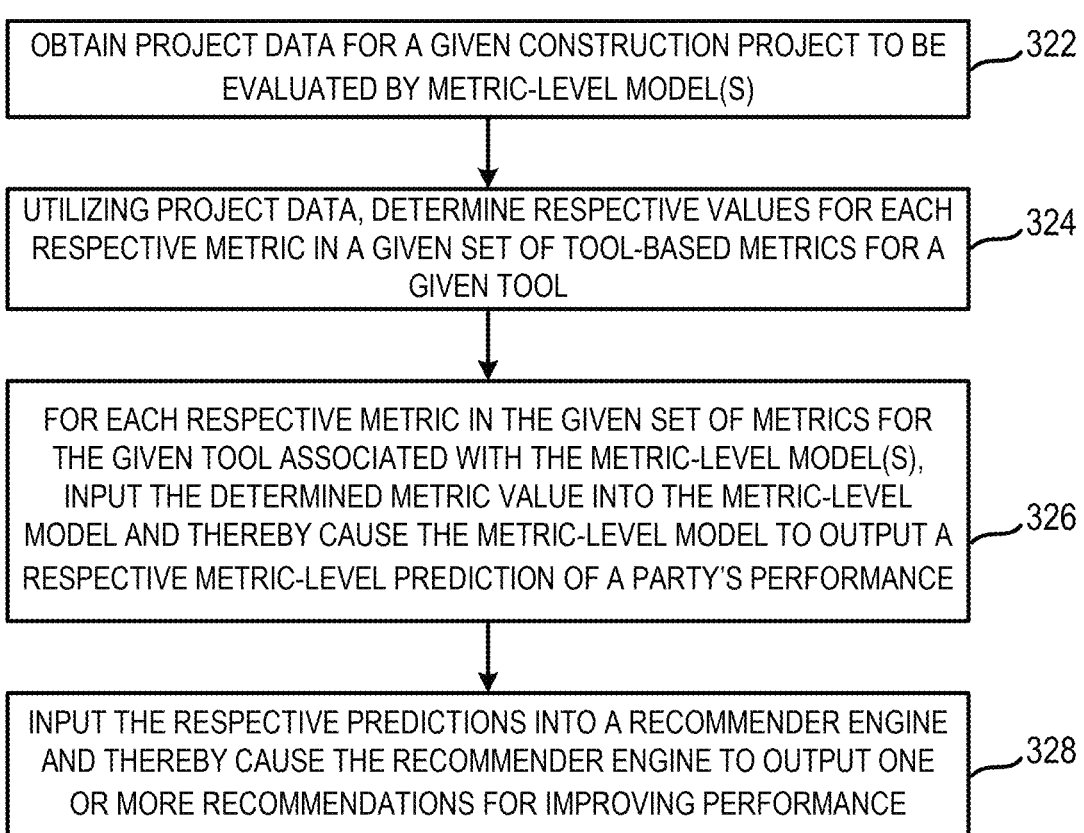

*320*

OBTAIN PROJECT DATA FOR A GIVEN CONSTRUCTION PROJECT TO BE EVALUATED BY METRIC-LEVEL MODEL(S) — 322

UTILIZING PROJECT DATA, DETERMINE RESPECTIVE VALUES FOR EACH RESPECTIVE METRIC IN A GIVEN SET OF TOOL-BASED METRICS FOR A GIVEN TOOL — 324

FOR EACH RESPECTIVE METRIC IN THE GIVEN SET OF METRICS FOR THE GIVEN TOOL ASSOCIATED WITH THE METRIC-LEVEL MODEL(S), INPUT THE DETERMINED METRIC VALUE INTO THE METRIC-LEVEL MODEL AND THEREBY CAUSE THE METRIC-LEVEL MODEL TO OUTPUT A RESPECTIVE METRIC-LEVEL PREDICTION OF A PARTY'S PERFORMANCE — 326

INPUT THE RESPECTIVE PREDICTIONS INTO A RECOMMENDER ENGINE AND THEREBY CAUSE THE RECOMMENDER ENGINE TO OUTPUT ONE OR MORE RECOMMENDATIONS FOR IMPROVING PERFORMANCE — 328

FIG. 3C

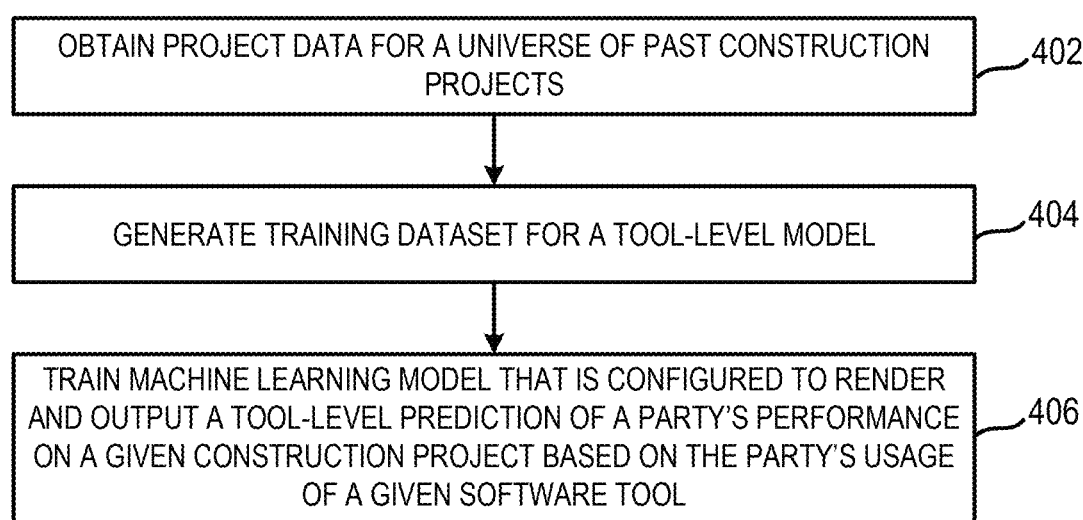
| OBTAIN PROJECT DATA FOR A UNIVERSE OF PAST CONSTRUCTION PROJECTS | 402 |
| GENERATE TRAINING DATASET FOR A TOOL-LEVEL MODEL | 404 |
| TRAIN MACHINE LEARNING MODEL THAT IS CONFIGURED TO RENDER AND OUTPUT A TOOL-LEVEL PREDICTION OF A PARTY'S PERFORMANCE ON A GIVEN CONSTRUCTION PROJECT BASED ON THE PARTY'S USAGE OF A GIVEN SOFTWARE TOOL | 406 |
FIG. 4A

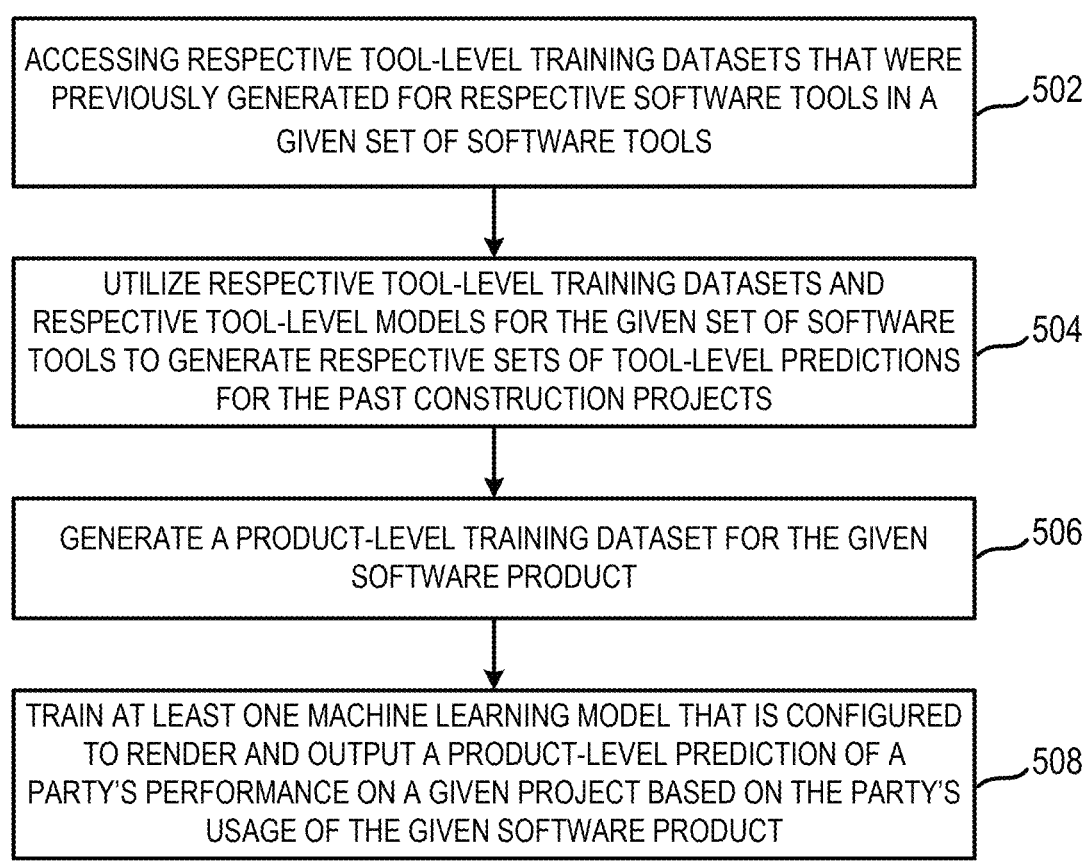

*500*

ACCESSING RESPECTIVE TOOL-LEVEL TRAINING DATASETS THAT WERE PREVIOUSLY GENERATED FOR RESPECTIVE SOFTWARE TOOLS IN A GIVEN SET OF SOFTWARE TOOLS ⟋502

UTILIZE RESPECTIVE TOOL-LEVEL TRAINING DATASETS AND RESPECTIVE TOOL-LEVEL MODELS FOR THE GIVEN SET OF SOFTWARE TOOLS TO GENERATE RESPECTIVE SETS OF TOOL-LEVEL PREDICTIONS FOR THE PAST CONSTRUCTION PROJECTS ⟋504

GENERATE A PRODUCT-LEVEL TRAINING DATASET FOR THE GIVEN SOFTWARE PRODUCT ⟋506

TRAIN AT LEAST ONE MACHINE LEARNING MODEL THAT IS CONFIGURED TO RENDER AND OUTPUT A PRODUCT-LEVEL PREDICTION OF A PARTY'S PERFORMANCE ON A GIVEN PROJECT BASED ON THE PARTY'S USAGE OF THE GIVEN SOFTWARE PRODUCT ⟋508

FIG. 5A

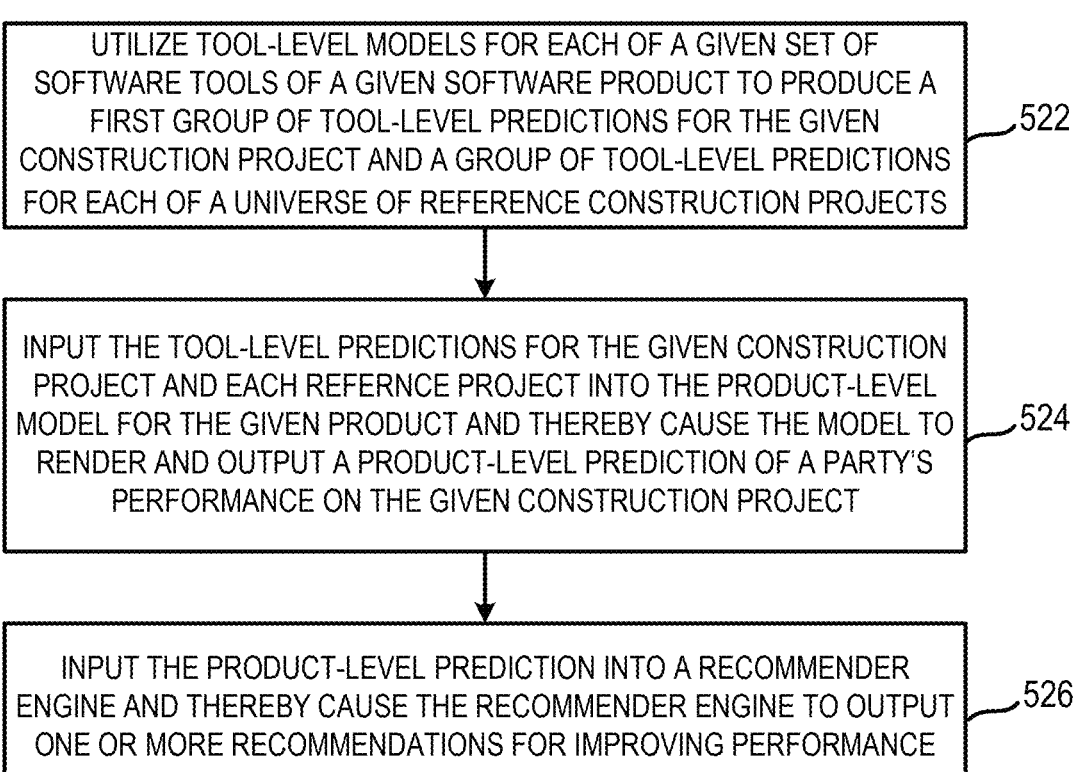

520

UTILIZE TOOL-LEVEL MODELS FOR EACH OF A GIVEN SET OF SOFTWARE TOOLS OF A GIVEN SOFTWARE PRODUCT TO PRODUCE A FIRST GROUP OF TOOL-LEVEL PREDICTIONS FOR THE GIVEN CONSTRUCTION PROJECT AND A GROUP OF TOOL-LEVEL PREDICTIONS FOR EACH OF A UNIVERSE OF REFERENCE CONSTRUCTION PROJECTS        522

INPUT THE TOOL-LEVEL PREDICTIONS FOR THE GIVEN CONSTRUCTION PROJECT AND EACH REFERNCE PROJECT INTO THE PRODUCT-LEVEL MODEL FOR THE GIVEN PRODUCT AND THEREBY CAUSE THE MODEL TO RENDER AND OUTPUT A PRODUCT-LEVEL PREDICTION OF A PARTY'S PERFORMANCE ON THE GIVEN CONSTRUCTION PROJECT        524

INPUT THE PRODUCT-LEVEL PREDICTION INTO A RECOMMENDER ENGINE AND THEREBY CAUSE THE RECOMMENDER ENGINE TO OUTPUT ONE OR MORE RECOMMENDATIONS FOR IMPROVING PERFORMANCE        526

FIG. 5B

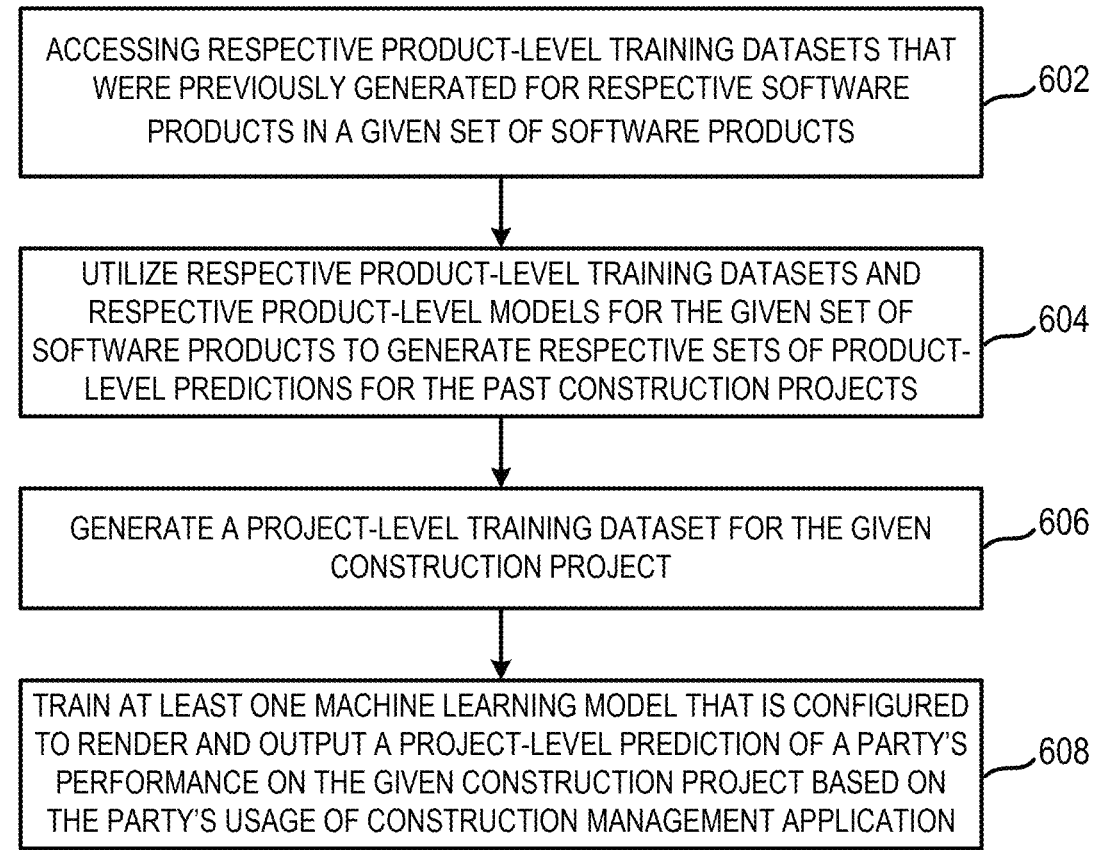

ACCESSING RESPECTIVE PRODUCT-LEVEL TRAINING DATASETS THAT WERE PREVIOUSLY GENERATED FOR RESPECTIVE SOFTWARE PRODUCTS IN A GIVEN SET OF SOFTWARE PRODUCTS ⟋602

UTILIZE RESPECTIVE PRODUCT-LEVEL TRAINING DATASETS AND RESPECTIVE PRODUCT-LEVEL MODELS FOR THE GIVEN SET OF SOFTWARE PRODUCTS TO GENERATE RESPECTIVE SETS OF PRODUCT-LEVEL PREDICTIONS FOR THE PAST CONSTRUCTION PROJECTS ⟋604

GENERATE A PROJECT-LEVEL TRAINING DATASET FOR THE GIVEN CONSTRUCTION PROJECT ⟋606

TRAIN AT LEAST ONE MACHINE LEARNING MODEL THAT IS CONFIGURED TO RENDER AND OUTPUT A PROJECT-LEVEL PREDICTION OF A PARTY'S PERFORMANCE ON THE GIVEN CONSTRUCTION PROJECT BASED ON THE PARTY'S USAGE OF CONSTRUCTION MANAGEMENT APPLICATION ⟋608

FIG. 6A

*620*

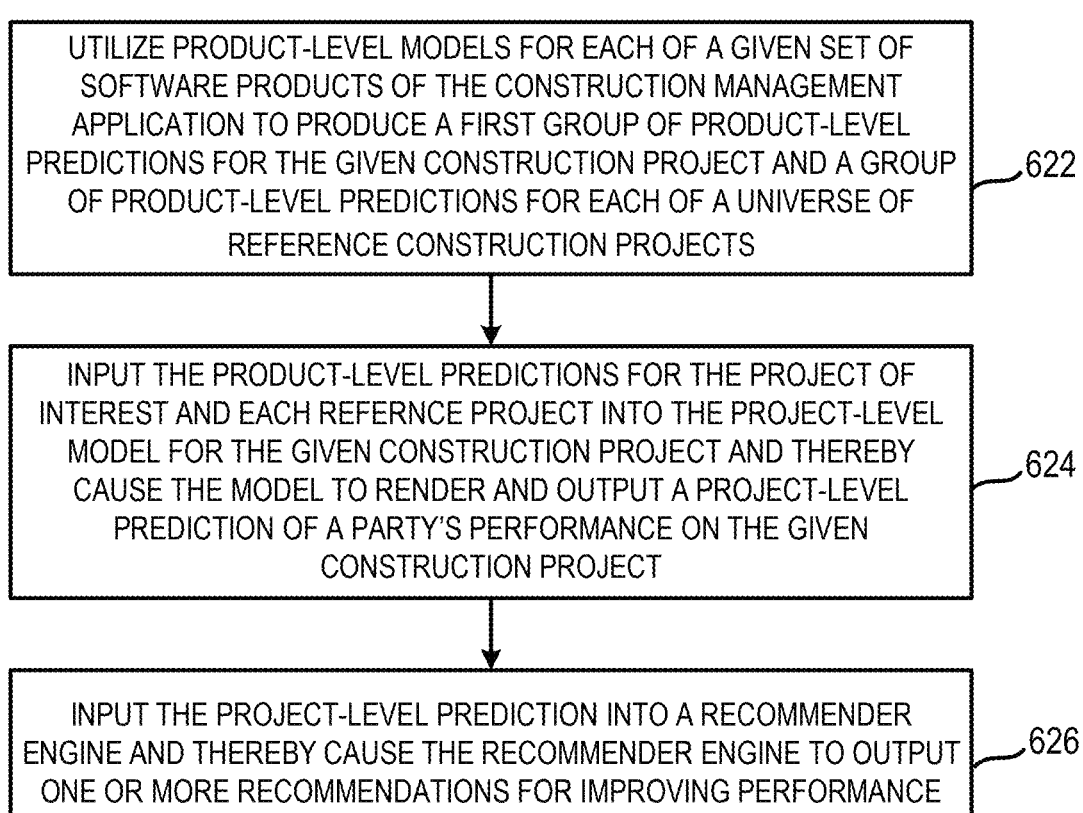

UTILIZE PRODUCT-LEVEL MODELS FOR EACH OF A GIVEN SET OF SOFTWARE PRODUCTS OF THE CONSTRUCTION MANAGEMENT APPLICATION TO PRODUCE A FIRST GROUP OF PRODUCT-LEVEL PREDICTIONS FOR THE GIVEN CONSTRUCTION PROJECT AND A GROUP OF PRODUCT-LEVEL PREDICTIONS FOR EACH OF A UNIVERSE OF REFERENCE CONSTRUCTION PROJECTS — 622

INPUT THE PRODUCT-LEVEL PREDICTIONS FOR THE PROJECT OF INTEREST AND EACH REFERNCE PROJECT INTO THE PROJECT-LEVEL MODEL FOR THE GIVEN CONSTRUCTION PROJECT AND THEREBY CAUSE THE MODEL TO RENDER AND OUTPUT A PROJECT-LEVEL PREDICTION OF A PARTY'S PERFORMANCE ON THE GIVEN CONSTRUCTION PROJECT — 624

INPUT THE PROJECT-LEVEL PREDICTION INTO A RECOMMENDER ENGINE AND THEREBY CAUSE THE RECOMMENDER ENGINE TO OUTPUT ONE OR MORE RECOMMENDATIONS FOR IMPROVING PERFORMANCE — 626

FIG. 6B

COMPUTING PLATFORM AND METHOD FOR PREDICTING CONSTRUCTION PROJECT PERFORMANCE BASED ON USAGE OF A CONSTRUCTION MANAGEMENT SOFTWARE APPLICATION

BACKGROUND

Construction management today is often performed through the use of software applications, such as the software application provided by Procore Technologies, Inc. @("Procore"), the applicant of the present disclosure. These construction management software applications may enable parties to electronically manage construction projects, which may involve software features for creating, storing, viewing, and/or interacting with various types of data objects that memorialize information related to a construction project, examples of which may include request for information ("RFI") data objects, daily log data objects, specifications data objects, building information modelling ("BIM") data objects, observation data objects, inspections data objects, invoice data objects, and/or timesheet data objects, among various other examples.

SUMMARY

Disclosed herein is new technology for generating performance predictions based on utilization, by a party, of one or more software tools within a construction management software application.

In one aspect, the disclosed technology may take the form of a method to be carried out by a computing platform that involves (I) creating a data science model that is configured to (a) receive a value for a metric that provides insight regarding a party's usage of a software tool of a construction management software application on a construction project and (b) based on an evaluation of the received value for the metric, output a prediction of the party's performance on the construction project, wherein the data science model is created by (i) obtaining project data for a universe of past construction projects, (ii) for each respective construction project in the universe of past construction projects, utilizing the respective project data for the respective construction project to determine (a) a respective metric value of the metric for the respective construction project and (b) a respective performance value that quantifies performance on the respective construction project, (iii) partitioning the respective metric values that are determined for the universe of past construction projects into a plurality of discrete ranges of metric values, (iv) for each respective range of metric values in the plurality of discrete ranges of metric values, determining a corresponding performance value that quantifies performance on a construction project having a metric value within the respective range of metric values, and (v) encoding the plurality of discrete ranges of metric value and corresponding performance values into the data science model, and (II) after creating the data science model, utilize the data science model to produce a prediction of a given party's performance on a given construction project that is based on the given party's usage of the software tool by (a) obtaining project data for a given construction project, (b) based on the obtained project data, determining a given value for the metric, and (c) inputting the given value for the metric into the data science model and thereby causing the data science model to (i) evaluate the given value of the metric, and (ii) based on the evaluation of the given value, output the prediction of the given party's performance on the given construction project.

The foregoing functionality may also be carried out for a second data science model. For example, the metric may be a first metric, the data science model may be a first data science model, and the prediction of the given party's performance on the given construction project may be a first prediction of the given party's performance on the given construction project and the method may additionally involve (i) creating a second data science model that is configured to (a) receive a value for a second metric that provides insight regarding a party's usage of the software tool on a construction project and (b) based on an evaluation of the received value for the second metric, predict the party's performance on the construction project and (ii) after creating the second data science model, utilize the second data science model to produce a second prediction of a given party's performance on a given construction project that is based on the given party's usage of the software tool. In a further example embodiment, the foregoing method may involve, based on the first and second predictions, generating a recommendation for improving the given party's performance on the given construction project by changing how the software tool is being used on the given construction project.

The prediction of the given party's performance on the given construction project may take various forms and, in some examples, the prediction of the given party's performance on the construction project may be a predicted performance value that quantifies the given party's performance on the given construction project. Further still, in an example embodiment the predicted performance value may quantify the given party's performance on the given construction project in terms of the given party's ability to meet one of a timing goal, a budget goal, a quality goal, or a safety goal.

The data science model's evaluation of the given value of the metric may take various forms and, in some examples, the data science model's evaluation of the given value of the metric involves (i) identifying, from the plurality of discrete ranges of metric values, a given range of metric values that encompasses the given value and (ii) identifying a corresponding performance value for the given range of metric values.

The plurality of discrete ranges of metric values may take various forms and, in some examples, the plurality of discrete ranges of metric values may be quantiles.

The universe of past construction projects may take various forms and, in some examples, the universe of past construction projects may be past construction projects that were managed using the construction management software application.

In another aspect, the disclosed technology may take the form of a method to be carried out by a computing platform that involves (I) applying a machine-learning process to a training dataset to train a machine-learning model that is configured to (a) receive, for a set of metrics that provide insight regarding usage of a software tool of a construction management software application, (i) a first set of metric-level input values for a construction project of interest and (ii) a respective set of metric-level input values for each of a universe of reference construction projects, and (b) based on an evaluation of the first and respective sets of metric-level input values, output a prediction of a party's performance on the construction project of interest and (II) after training the machine-learning model, utilizing the machine-learning model to produce a prediction of a given party's performance on a given construction project of interest that is based on the given party's usage of the software tool by (a) obtaining project data for (i) the given construction project of interest and (ii) a set of reference construction projects, (b) based on the obtained project data, determining (i) a first set of metric-level input values of the set of metrics for the given construction project of interest and (i) a respective set of metric-level input values of the set of metrics for each of the universe of reference construction projects, and (c) inputting the first and respective sets of metric-level input values into the machine-learning model and thereby causing the machine-learning model to (i) evaluate the first and respective sets of metric-level input values, and (ii) based on the evaluation of the first and respective sets of values, output the prediction of the given party's performance on the given construction project of interest.

The foregoing method may further involve additional functionality. For example, the method may additionally involve, based on the prediction, generating a recommendation for improving the given party's performance on the given construction project by changing how the software tool is being used on the given construction project of interest.

The foregoing method may further involve inputting tool-level predictions into a product-level model. For example, the machine-learning process may be a first machine-learning process, the training dataset may be a first training dataset, the machine learning model may be a first machine learning model, the set of metrics that provide insight regarding the software tool of the construction management software application may be a set of first metrics that provide insight regarding a first software tool of the construction management software application, the first set of metric-level input values for the construction project of interest may be a first set of first metric-level input values for the construction project of interest, the respective set of metric-level input values for each of the universe of reference construction projects may be a respective set of first metric-level input values for each of the universe of reference construction projects, the prediction of the party's performance on the construction project of interest may be a first tool-level prediction of the party's performance on the construction project of interest, the prediction of the given party's performance on the given construction project of interest may be a first tool-level prediction of the given party's performance on the given construction project of interest, and the method may additionally involve (I) applying a second machine-learning process to a second training dataset to train a second machine-learning model that is configured to (i) receive, for a set of second metrics that provide insight regarding usage of a second software tool of the construction management software application, (a) a first set of second metric-level input values for the construction project of interest and (b) a respective set of second metric-level input values for each of the universe of reference construction projects, and (ii) based on an evaluation of the first and respective sets of second metric-level input values, output a second tool-level prediction of the party's performance on the construction project of interest, (II) after training the second machine-learning model, utilizing the second machine-learning model to produce a second prediction of the given party's performance on the given construction project of interest that is based on the given party's usage of the second software tool, and (III) inputting, to a product-level model, (a) a group of tool-level predictions for the given construction project that comprises the first and second tool-level predictions of the party's performance on the given construction project of interest and (b) a respective group of tool-level predictions for each of the universe of reference construction projects that comprises the respective sets of first and second metric-level input values for each of the universe of reference construction projects, and, thereby, based on an evaluation of the received first group of tool-level predictions, output a product-level prediction of the party's performance on the given construction project that is based on the given party's usage of a software product.

The foregoing method may further involve inputting product-level predictions into a project-level model. For example, the product-level model may be a first product-level model, the group of tool-level predictions for the given construction project may be a first group of tool-level predictions, the respective group of tool-level predictions for each of the universe of reference construction projects may be a first respective group of tool-level predictions for each of the universe of reference construction projects, the product-level prediction of the party's performance on the given construction project may be a first product-level prediction of the party's performance on the given construction project, the software product may be a first software product and the method may additionally involve (I) inputting, to a second product-level model, (a) a second group of tool-level predictions for the given construction project of interest and (b) a second respective group of tool-level predictions for each of the universe of reference construction projects and, thereby, based on an evaluation of the received second group of tool-level predictions, output a second product-level prediction of the party's performance on the given construction project that is based on the given party's usage of a second software product, and (II) inputting, to a project-level model, (a) a group of product-level predictions for the given construction project that comprises the first and second project-level predictions of the party's performance on the given construction project of interest and (b) a respective group of product-level predictions for each of the universe of reference construction projects, and, thereby, based on an evaluation of the received group of product-level predictions, output a project-level prediction of the party's performance on the given construction project that is based on the given party's usage of the construction management software application.

The foregoing method may further involve inputting the project-level predictions into a party-level model. For example, the project-level model may be a first project-level model, the group of product-level predictions for the given construction project may be a first group of product-level predictions, the respective group of product-level predictions for each of the universe of reference construction projects may be a first respective group of product-level predictions for each of the universe of reference construction projects, the product-level prediction of the given party's performance on the given construction project may be a first product-level prediction of the given party's performance on the given construction project, the given construction project may be a first given construction project of interest and the method may additionally involve (I) inputting, to a second project-level model, (a) a second group of product-level predictions for a second given construction project of interest and (b) a second respective group of project-level predictions for each of the universe of reference construction projects and, thereby, based on an evaluation of the received second group of product-level predictions, output a second project-level prediction of the party's performance on the second given construction project that is based on the given party's usage of the construction management software application and (II) inputting, to a party-level model, (a) a group of project-level predictions for the first and second given construction projects that comprises the first and second project-level predictions of the party's performance and (b) a respective group of product-level predictions for each of the universe of reference construction projects, and, thereby, based on an evaluation of the received group of project-level predictions, output a party-level prediction of the party's performance on the given construction project that is based on the given party's usage of the construction management software application. The party-level prediction may take various forms, and, in some examples, the party-level prediction may be a score value that quantifies the given party's proficiency in using the construction management software application across the first and second given construction projects of interest.

The prediction of the given party's performance on the given construction project may take various forms and, in some examples, the prediction of the given party's performance on the given construction project may be a predicted performance value that quantifies the given party's performance on the given construction project. Further, the predicted performance value may take various forms, and, in some examples, the predicted performance value may quantify the given party's performance on the given construction project in terms of the given party's ability to meet one of a timing goal, a budget goal, a quality goal, or a safety goal.

In yet another aspect, disclosed herein is a computing platform that includes at least one processor, at least one non-transitory computer-readable medium, and program instructions stored on the at least one non-transitory computer-readable medium that are executable by the at least one processor to cause the computing platform to carry out the functions disclosed herein, including but not limited to the functions of the foregoing methods.

In yet another aspect, disclosed herein is a non-transitory computer-readable medium having stored thereon program instructions that that are executable to cause a computing platform to carry out the functions disclosed herein, including but not limited to the functions of the foregoing methods.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

BRIEF DESCRIPTION OF THE DRAWINGS

FIG. 3A is a flowchart for one possible implementation of functionality for creating a set of metric-level models in accordance with the present disclosure.

FIG. 3B is a table illustrating examples of metrics for which metric-level models could be created.

FIG. 3C is a flowchart for one possible implementation of functionality for utilizing one or more metric-level models to generate one or more predictions of a party's performance on a given construction project.

FIG. 4A is a flowchart for one possible implementation of functionality for creating a tool-level model in accordance with the present disclosure.

FIG. 5A is a flowchart for one possible implementation of functionality for creating a product-level model in accordance with the present disclosure.

FIG. 5B is a flowchart for one possible implementation of functionality for utilizing a product-level model to generate a prediction of a party's performance on a given construction project.

FIG. 6A is a flowchart for one possible implementation of functionality for creating a project-level model in accordance with the present disclosure.

FIG. 6B is a flowchart for one possible implementation of functionality for utilizing a project-level model to generate a prediction of a party's performance on a given construction project.

Figure 1A:
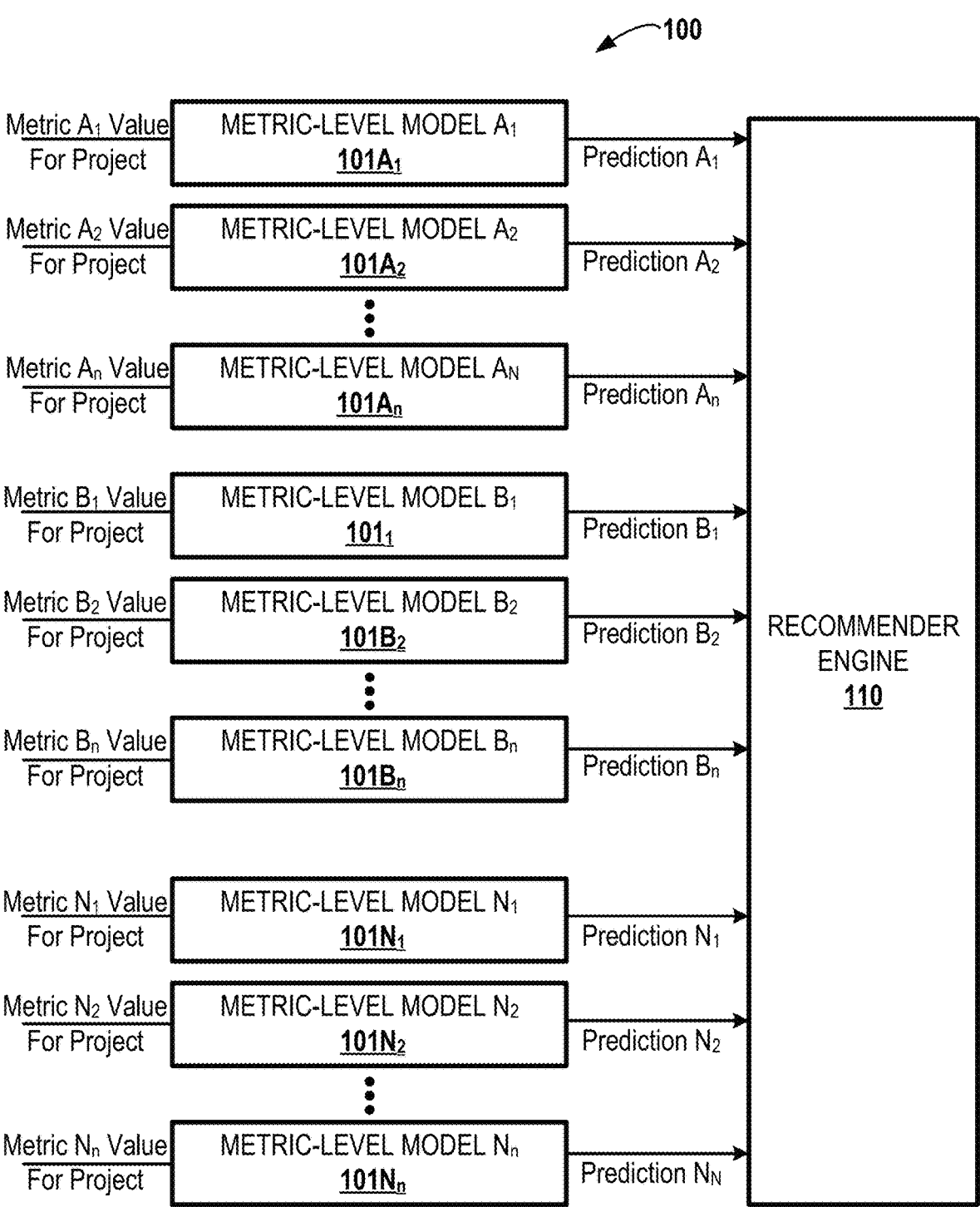
FIG. 1A is a block diagram for one example implementation of the disclosed technology for rendering metric-level predictions and deriving insights based thereon.

Features, aspects, and advantages of the presently disclosed technology may be better understood with regard to the following description, appended claims, and accompanying drawings, as listed below. The drawings are for the purpose of illustrating example embodiments, but those of ordinary skill in the art will understand that the technology disclosed herein is not limited to the arrangements and/or instrumentality shown in the drawings.

DETAILED DESCRIPTION

The following disclosure refers to the accompanying figures and several examples. A person of ordinary skill in the art should understand that such references are for the purpose of explanation only and are therefore not meant to be limiting. Part or all of the disclosed platforms, devices, and methods may be rearranged, combined, added to, and/or removed in a variety of manners, each of which is contemplated herein.

As noted above, construction management today is often performed through the use of software applications, such as the software application provided by Procore Technologies, Inc.® ("Procore"), the applicant of the present disclosure. In practice, these construction management software applications may take various forms. As one possible implementation, a construction management software application may include both front-end client software running on client devices that are accessible to individuals or parties associated with construction projects (e.g., contractors, project managers, architects, engineers, designers, etc.) and back-end software running on a back-end platform (sometimes referred to as a "cloud" platform) that interacts with and/or drives the front-end software, and which may be operated (either directly or indirectly) by the provider of the front-end client software. As another possible implementation, a construction management software application may include front-end client software that runs on client devices without interaction with a back-end platform. These software applications may take other forms as well.

Existing construction management software applications may enable parties to electronically manage construction projects, which may involve software features for creating, storing, viewing, and/or interacting with various types of data objects that memorialize information related to a construction project. These data objects could take various forms, examples of which may include request for information ("RFI") data objects, daily log data objects, specifications data objects, building information modelling ("BIM") data objects, observations data objects, inspections data objects, invoice data objects, and/or timesheet data objects, among various other examples.

In at least some implementations, the software features for creating, storing, viewing, and/or interacting with the various types of data objects may optionally be arranged into different software "tools" that each correspond to a different type (or category) of data object. For instance, a construction management software application may include an "RFIs" tool for creating, storing, viewing, and/or interacting with RFI data objects, a "Daily Log" tool for creating, storing, viewing, and/or interacting with daily log data objects, an "Observations" tool for creating, storing, viewing, and/or interacting with observation data objects, an "Inspections" tool for creating storing, viewing, and/or interacting with inspection data objects, an "Invoices" tool for creating, storing, viewing, and/or interacting with invoice data objects, and/or a "Timesheets" data object for creating, storing, viewing, and/or interacting with timesheet data objects, among various other examples. However, in other implementations, the software features for creating, storing, viewing, and/or interacting with the various types of data objects may be arranged in other manners (e.g., software features that operate across multiple different types of data objects) that are not based solely on a software tools paradigm.

Further, in at least some implementations, multiple software tools may be grouped together as a "software product" offered via the construction management software application. A product may include any number of software tools that are grouped together, for any reason, by the construction management software application. In some examples, a product offered by the construction management software application may be offered to a user in exchange for some payment or consideration (e.g., a subscription cost, a one-time purchase, a data-sharing agreement, etc.); however, it is contemplated that a product offered by a construction management software application may be offered to a user without a need for payment or consideration.

In practice, a software product may be a group of software tools that are grouped together based on a relationship between the software features provided by the software tools. For example, a "Project Management" product may comprise a group of software tools (e.g., an RFIs tool, a Daily Log tool, etc.) that provide software features related to project management tasks, a "Quality and Safety" product may comprise a group of software tools (e.g., an Inspections tool, a Observations tool, etc.) that provide software features related to quality and safety tasks, and a "Finance" product may comprise a group of software tools (e.g., an Invoices tool, a Timesheets tool, etc.) that provide software features related to finance tasks, among various other examples.

In general, using a construction management software application, such as the software application provided by Procore, may enable a party to manage a construction project in a more efficient and organized manner. As a result, using a construction management software application may enable a party to improve its performance on a construction project in terms of meeting a schedule for the construction project, meeting a financial budget for the construction project, and/or meeting quality and/or safety goals for the construction project, among other possible ways to measure a party's performance on a construction project.

However, merely just using a construction management software application to manage a construction project does not guarantee that a party will achieve improved performance on the construction project. Rather, a party typically has to use the construction management software application in accordance with the software provider's guidelines in order to achieve improved performance on a construction project. Unfortunately, using a construction management software application in accordance with the software provider's guidelines becomes increasingly difficult as the number of software features in the construction management software application grows. For instance, a given construction management software application may have hundreds or even thousands of different software features that facilitate management of a construction project, and it is often not practical or feasible for a party to utilize all of those different software features while managing a construction project—let alone utilize all of those different software features in the manner intended by the software provider. This problem is compounded by the fact that a party typically has many different users that are accessing and using the software features of the construction management software application on behalf of the party, each of which has a different level of knowledge and understanding of how to use the software features of the construction management software application.

Moreover, even if a party is using a construction management software application in accordance with the software provider's guidelines, this still may not necessarily maximize the party's performance on the construction project in terms of meeting a schedule for the construction project, meeting a financial budget for the construction project, meeting quality and/or safety goals for the construction project, etc. For instance, even if a party uses all of the available software features provided by a construction management software application to manage a construction project, the party's performance on the construction project may still vary depending on the particular manner in which the party is using certain of the software features, in practice.

In this respect, the manner in which the party is using certain software features may be having a positive impact on the party's performance on the construction project, whereas the manner in which the party is using other software features may be having only a neutral impact or perhaps even a negative impact on the party's performance on the construction project.

To illustrate with an example, consider a construction management software application that includes an "RFIs" tool, a "Daily Logs" tool, an "Observations" tool, an "Inspections" tool, an "Invoices" tool, and a "Timesheets" tool, among other possible software tools that may be included in a construction management software application. In such an example, merely just using all of these software tools does not necessarily guarantee that a party will meet or exceed its performance goals for a construction project. Rather, the particular manner in which the party is utilizing each of these different software tools may be impacting the party's performance on the construction project, and the party may be unknowingly using some software tools in a way that is negatively impacting the party's performance on the construction project.

Unfortunately, the construction management software applications that exist today do not include any software technology for evaluating a party's usage of the different software features provided by a construction management software application in order to predict the impact of that usage on the party's performance on the construction project and then present the party with usage recommendations for the construction management software application that are intended to help improve the party's performance on the construction project. As a result, parties often unknowingly utilize the construction management software applications that exist today in a suboptimal way.

To address these and other problems with existing technology for construction management software applications, disclosed herein is new software technology for (i) predicting how a party's usage of a construction management software application may impact its performance on a construction project (e.g., in terms of meeting a timing goal, a budget goal, or a quality/safety goal for the construction project) and (ii) deriving insights based on these performance predictions, examples of which may include usage recommendations for the construction management software application (e.g., tool usage recommendations) that are intended to help improve the party's performance on the construction project.

As described in further detail below, the disclosed software technology includes functionality for predicting how a party's usage of a construction management software application impacts the party's performance on construction projects (and deriving insights based thereon) at any of various different granularities. For example, such granularities for performance predictions may include (i) a prediction based on one particular metric that provides insight into a party's usage of a given software tool on a given construction project, which may be referred to herein as a "metric-level prediction," (ii) a prediction based on a party's usage of a given software tool on a given construction project, which may be referred to herein as a "tool-level prediction," (iii) a prediction based on a party's usage of a given software product (i.e., a collection of multiple software tools) on a given construction project, which may be referred to herein as a "product-level prediction," and/or (iv) a prediction based on a party's usage of all software products of interest (and/or all software tools of interest) on a given construction project, which may be referred to herein as a "project-level prediction." The disclosed technology for rendering each of these types of performance predictions and then deriving insights based thereon may take any of various forms.

Further, each of these different granularities of performance predictions may take any of various forms. For instance, as one possibility, a prediction of a party's performance may comprise a predicted value of a "performance parameter" that quantifies the party's performance on a given construction project in terms of the party's predicted ability to meet a timing goal, a budget goal, or a quality/safety goal, which may be referred to herein as a "performance parameter value" or simply a "performance value." Such a performance parameter may take any of various forms. As one example, a performance parameter value could take the form of a ratio between (i) a first value that quantifies the party's predicted performance with respect to meeting a timing, budget, or quality/safety goal, and (ii) a second value that quantifies the party's planned performance with respect to meeting a timing, budget, or quality/safety goal (e.g., a ratio of predicted versus planned number of days to complete a project, a ratio of predicted versus planned spend on a project, a ratio of predicted versus planned number of safety incidents on a project, etc.). In this respect, because a timing, budget, or quality/safety goal is typically represented in terms of a variable for which lower values are considered to reflect better performance (e.g., less days spent, less money spent, less safety incidents), a higher value of such a ratio is generally associated with lesser performance because it reflects that the party's predicted performance is expected to exceed the party's planned performance with respect to a timing, budget, or quality/safety goal. However, other examples are possible as well.

As another possibility, a prediction of a party's performance may comprise a predicted value that quantifies how the party's performance on a given construction project compares to the performance on other reference construction projects, which may be referred to herein as the party's "performance comparison value" or simply a "comparison value." Such a performance comparison value may take any of various forms, examples of which may include a percentile or quantile value, a ranking value, or a score value that indicates where the party's performance on the given construction project falls relative to the performance on other reference construction projects.

A prediction of a party's performance may take other forms as well.

Starting with the metric-level predictions, the disclosed technology for rendering a metric-level prediction may take the form of data science model referred to herein as a "metric-level model" that is configured to (i) receive a value for one particular metric that provides insight into a party's usage of a given software tool on a given construction project and then (ii) based on an evaluation of the received value for the given metric, render and output a prediction of a party's performance on the given construction project (e.g., in terms of meeting a timing goal, a budget goal, or a quality/safety goal for the construction project).

The particular metric for which such a metric-level model is created could take any of various forms, which may depend in part on the given software tool. To illustrate with a few examples, one possible metric for a Daily Logs software tool could take the form of a "usage rate" metric that indicates how often a party to a construction party records a daily log via the Daily Logs software tool, one possible metric for an Inspections software tool could take the form of an "inspection time" metric that indicates an amount (or average amount) of time spent during one or more inspections carried out with the assistance of the Inspections software tool, and one possible metric for an Invoices software tool could take the form of an "approval percentage" metric that indicates a rate at which invoices submitted via the Invoices software tool are approved. Metrics for these or other software tools may take various other forms, and additional examples of metrics that may be utilized to provide metric-level predictions are described in further detail below.

Further, the prediction that is output by such a metric-level model could take any of various forms, examples of which may include (i) a predicted performance value (or range of values) that quantifies the party's performance on the given construction project in terms of the party's predicted ability to meet a timing goal, a budget goal, or a quality/safety goal, and/or (ii) a predicted comparison value that quantifies the party's performance on the given construction project as compared to the performance on other reference construction projects, among other possibilities.

In at least some implementations, the disclosed technology may involve creating and deploying multiple different metric-level models for a given software tool, where each such metric-level model predicts a party's performance on a given construction project based on a different metric that provides insight regarding the party's usage of the given software tool. For instance, if there are multiple different metrics that provide insight regarding a party's usage of a given software tool, then multiple different metric-level models may be created and deployed for the given software tool: (i) a first metric-level model that outputs a first prediction of a party's performance based on a value of a first metric that provides insight regarding the party's usage of the given software tool, (ii) a second metric-level model that outputs a first prediction of a party's performance based on a value of a second metric that provides insight regarding the party's usage of the given software tool, and so on for each additional metric.

In line with the discussion above, the disclosed technology may then utilize a metric-level model's prediction as a basis for deriving an insight related to the party's usage of the construction management software application, such as a usage recommendation for the given software tool. In this respect, the disclosed technology may be configured to derive a separate insight based on the respective prediction from each individual metric-level model, and/or may be configured to derive an insight based on predictions from multiple different metric-level models—such as a tool-level insight that is derived based on the predictions from a set of metric-level models associated with a given software tool.

One example implementation of the disclosed technology for rendering metric-level predictions and deriving insights based thereon is illustrated in FIG. 1A. As shown, in this example implementation, the disclosed technology may take the form of a set of metric-level models 101 that are each configured to (i) receive, as input, a value of a respective metric that provides insight regarding a party's usage of a given software tool on a given construction project of interest and (ii) based on an evaluation of the received value, outputs a respective prediction of the party's performance on the given construction project of interest.

In practice, the set of metric-level models 101 may include any number of metric-level models 101 for each of a set of software tools. As illustrated, each metric-level model (e.g., metric-level model 101A₁) receives a value for a given metric (e.g., metric $A_1$), wherein the given metric provides insight regarding a party's usage of a given one of a set of software tools (e.g., software tool A). In line with the discussion above, each such metric may take any of various forms.

Each metric-level model 101 (e.g., metric-level model 101A₁) then outputs a respective prediction of a party's performance (e.g., "Prediction $A_1$") in response to the input of the value for the given metric (e.g., "Metric $A_1$ Value For Project"). This may be repeated, as illustrated, for any number "n" of metrics, each of which is associated with one of any number "N" of software tools. In line with the discussion above, each such prediction may take the form of (i) a predicted performance value (or range of values) that quantifies the party's performance on the given construction project in terms of the party's predicted ability to meet a timing goal, a budget goal, or a quality/safety goal, and/or (ii) a predicted comparison value that quantifies the party's performance on the given construction project as compared to the performance on other reference construction projects, among other possibilities.

As further shown in FIG. 1A, the predictions of the party's performance output by the set of metric-level models 101 may be input to a recommender engine 110, which then generates and outputs one or more usage recommendations for improving performance on the construction project of interest. For example, the recommender engine may evaluate the various performance predictions output by the set of metric-level models 101 for a given software tool (or across multiple software tools) to identify the tool-specific metrics associated with the lowest performance predictions (e.g., prediction(s) that fall within lower percentiles for performance), and, then, generate one or more recommendations for changing the usage of the given software tool (or multiple software tools) so as to change the values of the identified metrics in a positive way. While the recommender engine 110 is shown as a single engine that receives metric-level predictions across multiple software tools, it should be understood that a separate recommender engine could be implemented for each respective software tool.

In some examples, the recommender engine 110 may also employ weights that are applied to the predictions output by the metric-level models 101 when generating the one or more usage recommendations. For example, a first metric for a given software tool may have been seen to have a greater impact on some performance parameter than a second metric for the given software tool; thus, the recommender engine 110 may give the prediction output based on the first metric a greater pre-determined weight than the prediction output based on the second metric when generating the one or more usage recommendations associated with the given software tool.

The disclosed technology for generating metric-level predictions and deriving insights based thereon may take various other forms as well, including but not limited to the possibility that metric-level predictions may be rendered for some software tools of a construction management software project but not others.

Turning next to the tool-level predictions, the disclosed technology for rendering a tool-level prediction of a party's performance on a given construction project based on the party's usage of a given software tool on the given construction project may take the form of a data science model referred to herein as a "tool-level model" that is configured to (i) receive, for a given set of metrics that provide insight regarding usage of the given software tool, (a) a first set of metric-level input values for the given construction project and perhaps also (b) a respective set of metric-level input values for each of a universe of reference construction projects, and (ii) based on an evaluation of the received sets of metric-level input values for the given set of metrics, render and output a prediction of the party's performance on the given construction project (e.g., in terms of meeting a timing goal, a budget goal, or a quality/safety goal for the construction project) that is based on the party's usage of the given software tool.

The tool-level model could take any of various forms, and in at least some implementations, the tool-level model may comprise a machine-learning model that is trained by applying a machine-learning process to training data.

Further, the given set of metrics that define the inputs of a tool-level model for a given software tool may comprise any one or more metrics that provide insight into a party's usage of the given software tool, and examples of such metrics are described in further detail below.

Further yet, the metric-level input values for the given set of metrics could take the form of determined metric values for the given set of metrics and/or metric-level predictions that are output by the metric-level models for the given set of metrics (e.g., predicted comparison values such as percentile or quantile values), among other possibilities.

Still further, the tool-level prediction that is output by such a tool-level model could take any of various forms, examples of which may include (i) a predicted performance value that quantifies the party's performance on the given construction project in terms of the party's predicted ability to meet a timing goal, a budget goal, or a quality/safety goal, and/or (ii) a predicted comparison value that quantifies the party's performance on the given construction project as compared to the performance on other reference construction projects, among other possibilities.

In line with the discussion above, the disclosed technology may then utilize a tool-level model's prediction as a basis for deriving an insight related to the party's usage of the construction management software application, such as a usage recommendation for the given software tool.

Figure 1B:
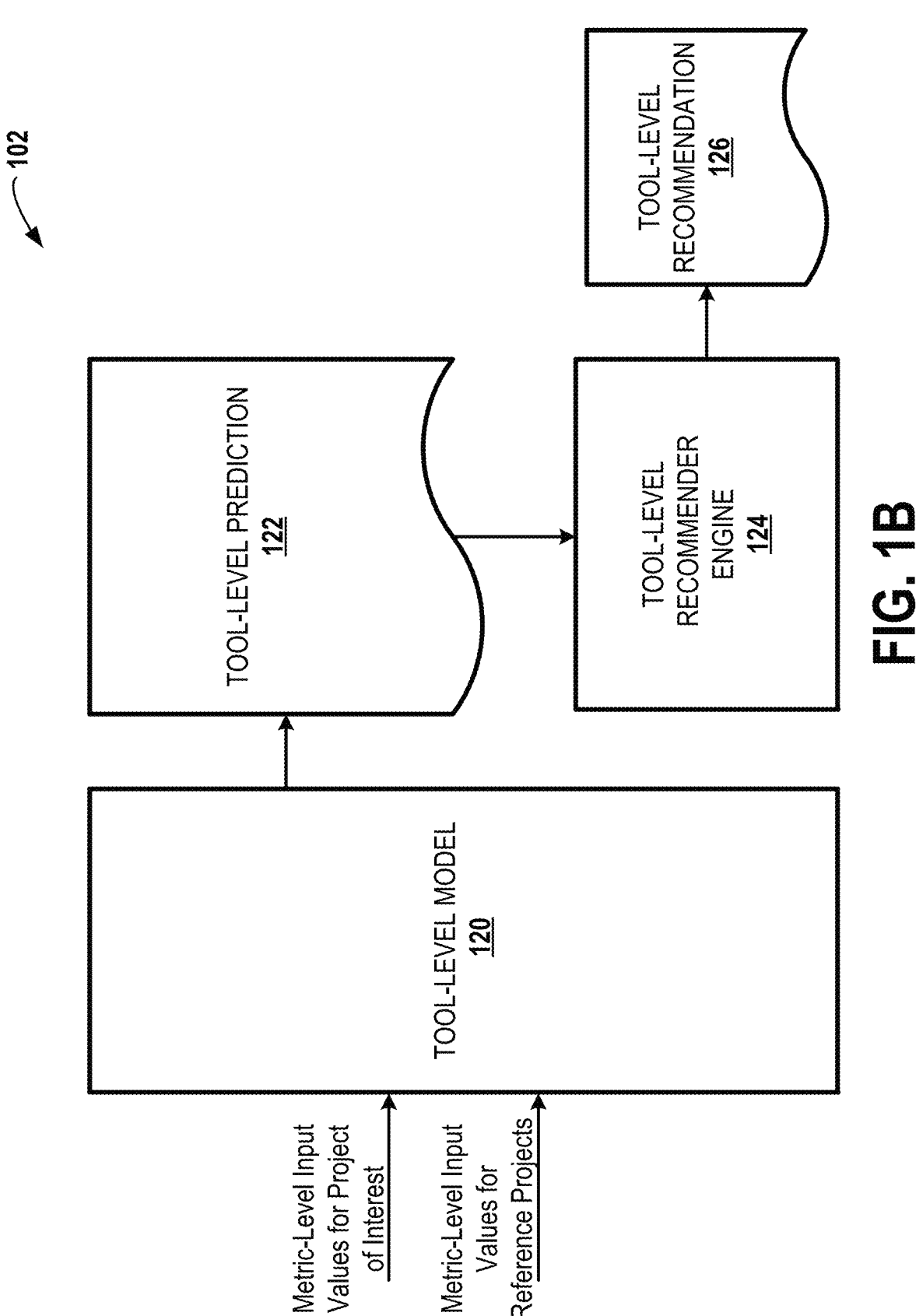
FIG. 1B is a block diagram for one example implementation of the disclosed technology for rendering a tool-level prediction and deriving insights based thereon.

One example implementation of the disclosed technology for rendering a tool-level prediction and deriving insights based thereon is illustrated in FIG. 1B. As shown, in this example implementation, the disclosed technology may take the form of a tool-level model 120 that is configured to (i) receive, for a given set of tool-based metrics that provide insight regarding usage of a given software tool, (a) a first set of input values for a construction project of interest (i.e., a construction project on which a party's performance is to be predicted) and (b) a respective set of input values for each of a universe of reference construction projects, and (ii) output a tool-level prediction 122 of a party's performance on the construction project of interest that is based on the party's usage of the given software tool (e.g., a prediction of performance in terms of one or more of a timing goal, a budget goal, a quality/safety goal, etc.). In line with the discussion above, the tool-level prediction 122 may comprise one or both of (i) a predicted performance value that quantifies the party's performance on the given construction project in terms of the party's predicted ability to meet a timing goal, a budget goal, or a quality/safety goal, and/or (ii) a predicted comparison value that quantifies the party's performance on the given construction project relative to the performance on other reference construction projects in the universe (e.g., a percentile or quantile value), among other possibilities.

Once the tool-level prediction 122 is made, it then may be input into a tool-level recommender engine 124, which uses the tool-level prediction 122 as a basis for generating and outputting one or more tool-level recommendation(s) 126 for improving performance at the tool-level. For instance, as one possible implementation, the tool-level recommender engine 124 may be configured to generate and output one or more tool-level recommendation(s) 126 based exclusively on the tool-level prediction 122 for the given software tool, in which case the one or more tool-level recommendation(s) 126 may comprise recommendations for how to better utilize the given software tool. As another possible implementation, the tool-level recommender engine 124 may be configured to generate and output one or more tool-level recommendation(s) 126 based on tool-level predictions for multiple different software tools (including the tool-level prediction 122 for the given software tool), in which case the one or more tool-level recommendation(s) 126 may comprise recommendations for how to better utilize one or more of the multiple different software tools (e.g., by identifying which one or more software tools are negatively impacting the party's performance on the construction project and/or which one or more software tools present the most opportunity for improving performance). In such an implementation, the tool-level recommender engine 124 could also optionally be configured to employ weights that are applied to the tool-level predictions when generating the one or more tool-level recommendation(s) 126. The tool-level recommender engine 124 could take other forms as well.

The disclosed technology for generating tool-level predictions and deriving insights based thereon may take various other forms as well.

Turning next to the product-level predictions, the disclosed technology for rendering a product-level prediction of a party's performance on a given construction project based on the party's usage of a given software product on the given construction project may take the form of data science model referred to herein as a "product-level model" that is configured to (i) receive, for a given set of software tools included as part of the given software product, (a) a first group of tool-level predictions for the given construction project and perhaps also (b) a respective group of tool-level predictions for each of a universe of reference construction projects, and (ii) based on an evaluation of the received sets of tool-level predictions, render and output a prediction of the party's performance on the given construction project (e.g., in terms of meeting a timing goal, a budget goal, or a quality/safety goal for the construction project) that is based on the party's usage of the given software product.

The product-level model could take any of various forms, and in at least some implementations, the product-level model may comprise a machine-learning model that is trained by applying a machine-learning process to training data.

Further, the given set of software tools that define the inputs of a product-level model for a given software product may comprise any set of software tools that are grouped together into a software product, and examples of such software tools are described in further detail below.

Further yet, the tool-level predictions that are input into such a product-level model and the product-level prediction that is output by such a product-level model could take any of various forms, examples of which may include (i) a predicted performance value that quantifies the party's performance on the given construction project in terms of the party's predicted ability to meet a timing goal, a budget goal, or a quality/safety goal, and/or (ii) a predicted comparison value that quantifies the party's performance on the given construction project as compared to the performance on other reference construction projects, among other possibilities.

In line with the discussion above, the disclosed technology may then utilize a product-level model's prediction as a basis for deriving an insight related to the party's usage of the construction management software application, such as a usage recommendation for the given software product.

Figure 1C:
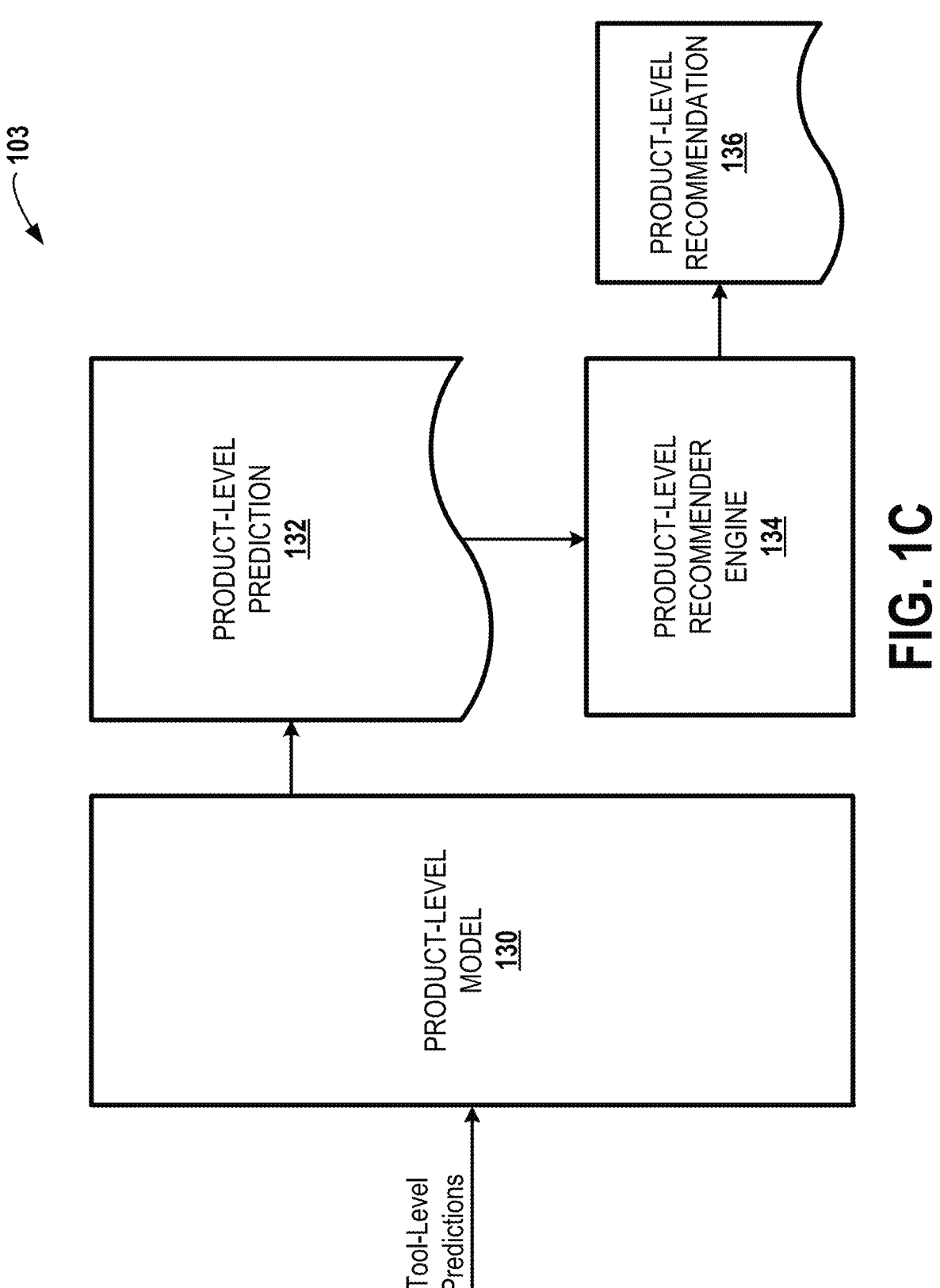
FIG. 1C is a block diagram for one example implementation of the disclosed technology for rendering a product-level prediction and deriving insights based thereon.

One example implementation of the disclosed technology for rendering a product-level prediction and deriving insights based thereon is illustrated in FIG. 1C. As shown, in this example implementation, the disclosed technology may take the form of a product-level model 130 that is configured to (i) receive, for a given set of software tools included as part of a given software product, (a) a first set of tool-level predictions for a construction project of interest (i.e., a construction project on which a party's performance is to be predicted) and (b) a respective set of tool-level predictions for each of a universe of reference construction projects, and (ii) output a product-level prediction 132 of a party's performance on the construction project of interest that is based on the party's usage of the given software product (e.g., a prediction of performance in terms of a timing goal, a budget goal, a quality/safety goal, etc.).

Inputs to the product-level model 130 may take a similar form to outputs of a tool-level model, such as the tool-level model(s) 120 discussed with respect to FIG. 1B. However, inputs to the product-level model 130 may take various other forms.

Further, the product-level prediction 132 may comprise one or both of (i) a predicted value of a performance parameter that quantifies the party's performance on the given construction project in terms of the party's predicted ability to meet a timing goal, a budget goal, or a quality/safety goal, and/or (ii) a predicted value that quantifies the party's performance on the given construction project relative to the performance on other reference construction projects in the universe (e.g., a percentile or quantile value), among other possibilities.

Once the product-level prediction 132 is made, it then may be input into a product-level recommender engine 134, which uses the product-level prediction 132 as a basis for generating and outputting one or more product-level recommendation(s) 136 for improving performance at the product-level. For instance, as one possible implementation, the product-level recommender engine 134 may be configured to generate and output one or more product-level recommendation(s) 136 based exclusively on the product-level prediction 132 for the given software product, in which case the one or more product-level recommendation(s) 136 may comprise recommendations for how to better utilize the given software product. As another possible implementation, the product-level recommender engine 134 may be configured to generate and output one or more product-level recommendation(s) 136 based on product-level predictions for multiple different software products (including the product-level prediction 132 for the given software product), in which case the one or more product-level recommendation(s) 136 may comprise recommendations for how to better utilize one or more of the multiple different software products (e.g., by identifying which one or more software products are negatively impacting the party's performance on the construction project and/or which one or more software products present the most opportunity for improving performance). In such an implementation, the product-level recommender engine 136 could also optionally be configured to employ weights that are applied to the product-level predictions when generating the one or more product-level recommendation(s) 136. The product-level recommender engine 136 could take other forms as well.

The disclosed technology for generating product-level predictions and deriving insights based thereon may take various other forms as well.

Turning next to the project-level predictions, the disclosed technology for rendering a project-level prediction of a party's performance on a given construction project based on the party's usage of all software products of interest (and/or all software tools of interest) on the given construction project may take the form of data science model referred to herein as a "project-level model" that is configured to (i) receive, for a given set of software products utilized for the given construction project, (a) a first set of product-level predictions for the given construction project and perhaps also (b) a respective set of product-level predictions for each of a universe of reference construction projects, and (ii) based on an evaluation of the received sets of product-level predictions, render and output a prediction of the party's performance on the given construction project (e.g., in terms of meeting a timing goal, a budget goal, or a quality/safety goal for the construction project) that is based on the party's usage of the given set of software projects on the given construction project.

The project-level model could take any of various forms, and in at least some implementations, the project-level model may comprise a machine-learning model that is trained by applying a machine-learning process to a training dataset.

Further, the given set of software products that define the inputs of a project-level model may comprise any set of software products that are included as part of the construction management software application, and examples of such software products are described in further detail below.

Further yet, the product-level predictions that are input into such a project-level model and the project-level prediction that is output by such a project-level model could take any of various forms, examples of which may include (i) a predicted performance value that quantifies the party's performance on the given construction project in terms of the party's predicted ability to meet a timing goal, a budget goal, or a quality/safety goal, and/or (ii) a predicted comparison value that quantifies the party's performance on the given construction project as compared to the performance on other reference construction projects, among other possibilities.

In line with the discussion above, the disclosed technology may then utilize a project-level model's prediction as a basis for deriving an insight related to the party's usage of the construction management software application, such as a usage recommendation for the given construction project.

Figure 1D:
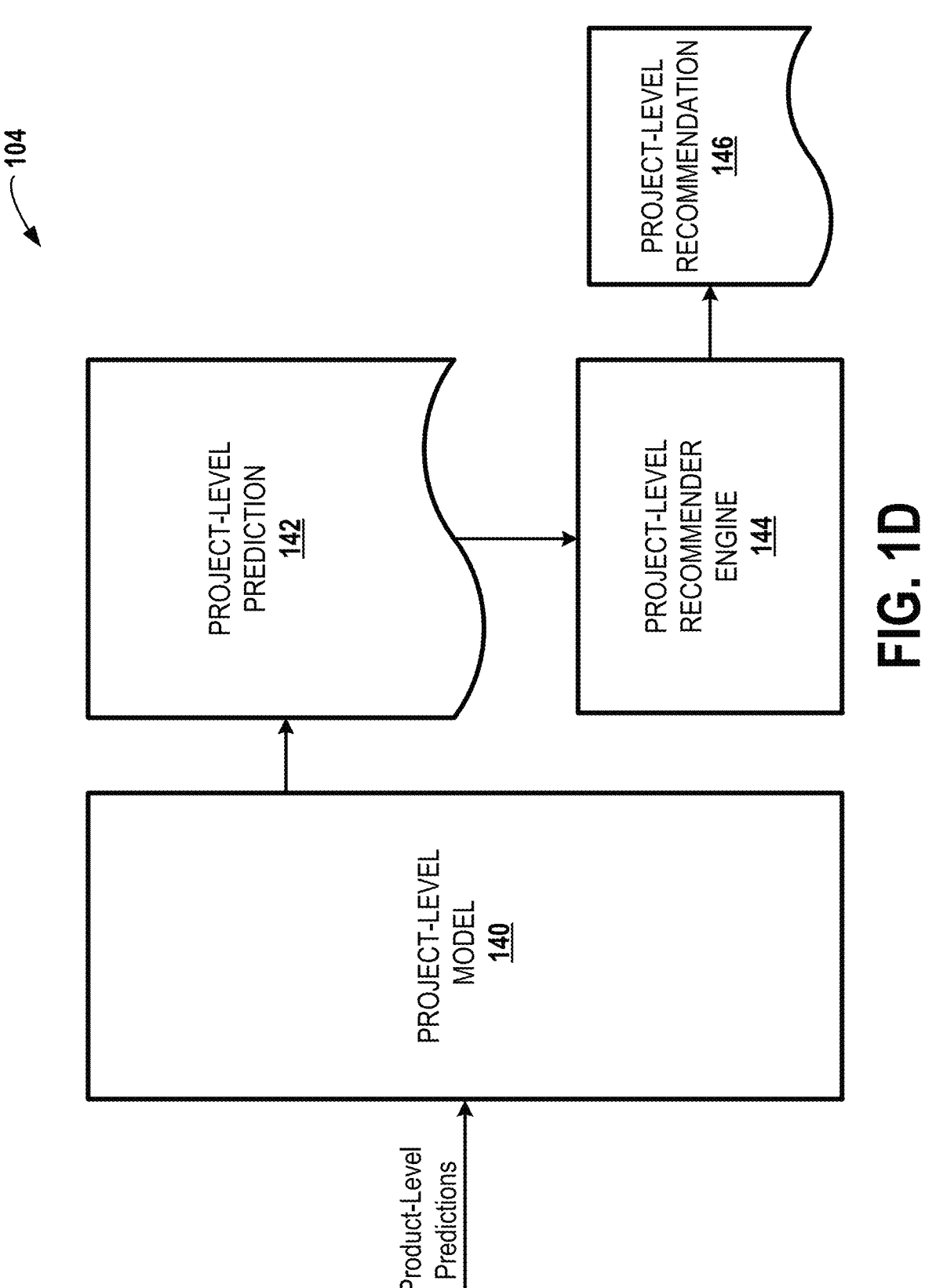
FIG. 1D is a block diagram for one example implementation of the disclosed technology for rendering a project-level prediction and deriving insights based thereon.

One example implementation of the disclosed technology for rendering a project-level prediction and deriving insights based thereon is illustrated in FIG. 1D. As shown, in this example implementation, the disclosed technology may take the form of a project-level model 140 that is configured to (i) receive, for a given set of software products, (a) a first set of product-level predictions for a construction project of interest (i.e., a construction project on which a party's performance is to be predicted) and (b) a respective set of product-level predictions for each of a universe of reference construction projects, and, and (iii) output a project-level prediction 142 of a party's performance on the construction project of interest that is based on the party's usage of the given set of software projects on the given construction project.

Inputs to the project-level model 140 may take a similar form to outputs of a product-level model, such as the product-level model(s) 130 discussed with respect to FIG. 1C. However, inputs to the project-level model 140 may take various other forms.

Further, the project-level prediction 142 may comprise one or both of (i) a predicted performance value that quantifies the party's performance on the given construction project in terms of the party's predicted ability to meet a timing goal, a budget goal, or a quality/safety goal, and/or (ii) a predicted comparison value that quantifies the party's performance on the given construction project as compared to the performance on other reference construction projects in the universe (e.g., a percentile or quantile value), among other possibilities.

Once the project-level prediction 142 is made, it then may be input into a project-level recommender engine 144, which uses the project-level prediction 142 as a basis for generating and outputting one or more project-level recommendation(s) 146 for improving performance at the project-level. For instance, as one possible implementation, the project-level recommender engine 144 may be configured to generate and output one or more project-level recommendation(s) 146 based exclusively on the project-level prediction 142 for a given construction project of interest, in which case the one or more project-level recommendation(s) 146 may comprise recommendations for how to better utilize the construction management software application on the given construction project of interest. As another possible implementation, the project-level recommender engine 144 may be configured to generate and output one or more project-level recommendation(s) 146 based on the project-level predictions for multiple different construction projects of interest (including the project-level prediction 142 for the given construction project of interest), in which case the one or more project-level recommendation(s) 146 may comprise recommendations for how to better utilize the construction management software application on one or more of the party's construction projects. In such an implementation, the project-level recommender engine 144 could also optionally be configured to employ weights that are applied to the product-level predictions when generating the one or more project-level recommendation(s) 146. The project-level recommender engine 144 could take other forms as well.

The disclosed technology for generating project-level predictions and deriving insights based thereon may take various other forms as well.

The foregoing predictions may also be utilized to generate certain insights regarding a party's use of the construction management software application across multiple construction projects, which may be referred to herein as "party-level insights."

For instance, as one possibility, the disclosed technology for generating a party-level insight may take the form of data science model that is configured to (i) receive a set of project-level predictions for a set of the party's construction projects and (ii) based on an evaluation of the received set of project-level predictions, render and output a "score" value that quantifies the party's proficiency in using the construction management software application across its set of construction projects.

The set of construction projects for which the project-level predictions are input into the data science model may comprise any set of construction projects involving the party.

Further, the project-level predictions that are input into such a data science model could take any of various forms, examples of which may include (i) a predicted performance value that quantifies the party's performance on the given construction project in terms of the party's predicted ability to meet a timing goal, a budget goal, or a quality/safety goal, and/or (ii) a predicted comparison value that quantifies the party's performance on the given construction project as compared to the performance on other reference construction projects (e.g., a percentile or quantile value), among other possibilities.

Further yet, the score value that is output by such a data science model could take any of various forms, one example of which may include a value from 0 to 100 where values closer to 0 indicate that the party has not used the construction management software application in a proficient way and values closer to 100 indicate that the party has used the construction management software application in a proficient way.

As another possibility, the disclosed technology for generating a party-level insight may take the form of a data science model that is configured to (i) receive a set of predictions output by a given tool-level model or a given product-level model across multiple construction projects involving a party and (ii) based on an evaluation of the received set of predictions, render and output a "score" value that quantifies the party's proficiency in using the given software tool or the given software product across its set of construction projects.

As yet another possibility, the disclosed technology for generating a party-level insight may take the form of a data science model that is configured to (i) receive sets of predictions output by a set of metric-level models, a set of tool-level models, or a set of product-level models across multiple construction projects involving a party and (ii) based on an evaluation of the received set of predictions, render and output a usage recommendation for the construction management software application, which may take any of various forms.

For example, if a data science model is configured to receive sets of metric-level predictions across the multiple construction projects involving the party, the data science model may be configured output a recommendation for using the software tools of the construction management software application in a more proficient way that includes an identification of which one or more software tools are most negatively impacting performance and/or present the most opportunity for improving performance if used in a more proficient way, an identification of which tool usage behaviors are most negatively impacting performance and/or present the most opportunity for improving performance if such behaviors are changed, and/or a suggestion for how to use one or more software tools in a more proficient way (e.g., by changing tool usage behavior).

As another example, if a data science model is configured to receive sets of tool-level predictions across the multiple construction projects involving the party, the data science model may be configured output a recommendation for using the software tools of the construction management software application in a more proficient way that includes an identification of which one or more software tools are most negatively impacting performance and/or present the most opportunity for improving performance if used in a more proficient way.

As yet another example, if a data science model is configured to receive sets of product-level predictions across the multiple construction projects involving the party, the data science model may be configured output a recommendation for using the software tools of the construction management software application in a more proficient way that includes an identification of which one or more software products are most negatively impacting performance and/or present the most opportunity for improving performance if used in a more proficient way.

As a further possibility, the disclosed technology may utilize a party-level score value as a basis for deriving another insight related to the party's usage of the construction management software application, which may take the form of a usage recommendation for the construction management software application and/or a ranking of the party's usage of the construction management software application as compared to other parties' usage of the construction management software application.

The party-level insights that are generated in accordance with the present disclosure, and the manner in which such party-level insights are used, may take other forms as well.

Figure 1E:
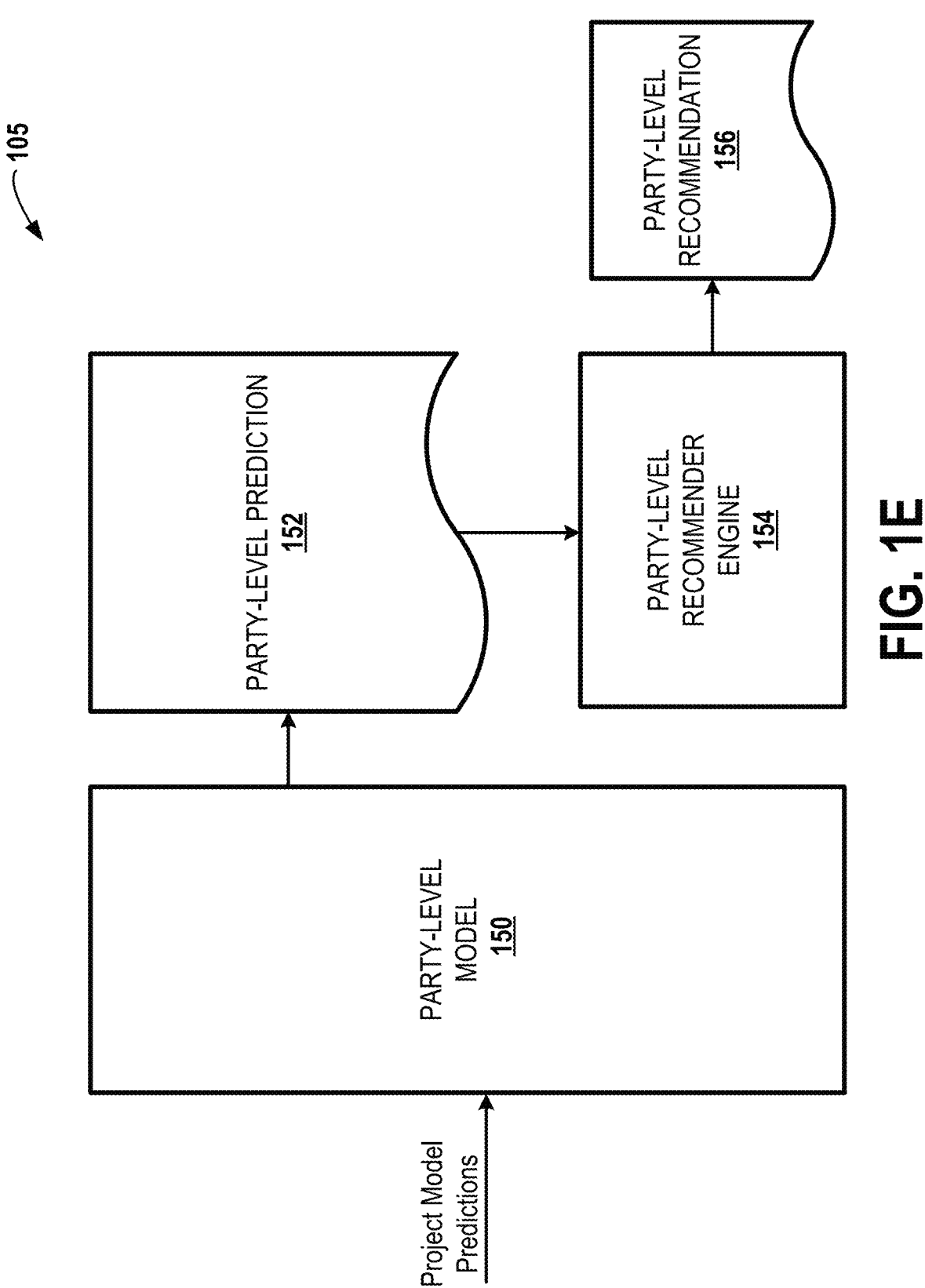
FIG. 1E is a block diagram for one example implementation of the disclosed technology for generating a party-level insight based on the foregoing predictions.

One example implementation of the disclosed technology for generating a party-level insight based on the foregoing predictions is illustrated in FIG. 1E. As shown, in this example implementation, the disclosed technology may take the form of a party-level model 150 that is configured to (i) receive, as input, a set of project-level predictions for a set of the party's construction projects that are (or were) managed utilizing the construction management software application, and (ii) output a party-level score value that quantifies the party's proficiency in using the construction management software application across its set of construction projects.

Inputs to the party-level model 150 may take a similar form to outputs of a project-level model, such as the project-level model(s) 140 discussed with respect to FIG. 1D. However, inputs to the party-level model 150 may take various other forms.

Once the party-level score 152 is determined, it then may be input into a party-level recommender engine 154, which uses the party-level score 152 as a basis for generating and outputting one or more party-level recommendation(s) 156 for improving performance at the party-level. Alternatively, the party-level recommender engine 154 may generate such recommendations based on predictions rendered by metric-level, tool-level, and/or product-level models across the party's construction projects.

The disclosed technology for generating party-level insights may take various other forms as well.

The disclosed technology for predicting how a party's usage of a construction management software application may impact its performance on a construction project and deriving insights based on these performance predictions improves upon the existing computer-based technologies for construction management software applications. For instance, as explained below, the disclosed software technology provides a mechanism for analyzing usage of a construction management software application and predicting performance, on a given construction project, within the construction management software application. Such analysis of usage and resultant predictions can occur at various levels within the construction management software application (e.g., a metric-level, a tool-level, a product-level, a project-level, a party-level, etc.), thus providing various granularities in analysis and resultant predictions based on such a level. These predictions may provide an improved user experience within the construction management software application, as recommendations that are based on the predictions may be presented to a user of the construction management software application that advise the user of ways to improve his/her/their performance within the construction management software application.

Additionally, the insights that may be generated based on the performance predictions in accordance with the present disclosure provide various advantages. For example, the disclosed insights can be used to help drive improved usage of the construction management software application at a tool level, a product level, or a project level. As another example, the disclosed insights can be used to evaluate a given party's proficiency in using a construction management software application, which may serve as a basis for defining a risk profile for the given party and/or comparing the given party against other parties. As yet another example, the disclosed insights can be used to demonstrate the value provided by the construction management software application, such as the performance benefits that can be achieved by using the different software tools and/or software products of the construction management software application, which can be leveraged by the provider of the construction management software application to expand its user base at an application and/or product level.

As demonstrated below, the disclosed software technology improves upon the existing computer-based technologies for construction management software applications in various other ways as well.

In practice, the disclosed software technology may be incorporated into a construction software management software application, which may take any of the forms described above. For instance, as one possible implementation, the disclosed software technology may be incorporated into a construction management software application comprising both front-end client software running on client devices that are accessible to individuals or parties associated with construction projects (e.g., contractors, project managers, architects, engineers, designers, etc.) and back-end software running on a back-end platform (sometimes referred to as a "cloud" platform) that interacts with and/or drives the front-end software, and which may be operated (either directly or indirectly) by the provider of the front-end client software. As another possible implementation, the disclosed software technology may be incorporated into a construction management software application comprising front-end client software that runs on client devices without interaction with a back-end platform. The disclosed software technology may be incorporated into a construction management software application that takes other forms as well.

Figure 2:
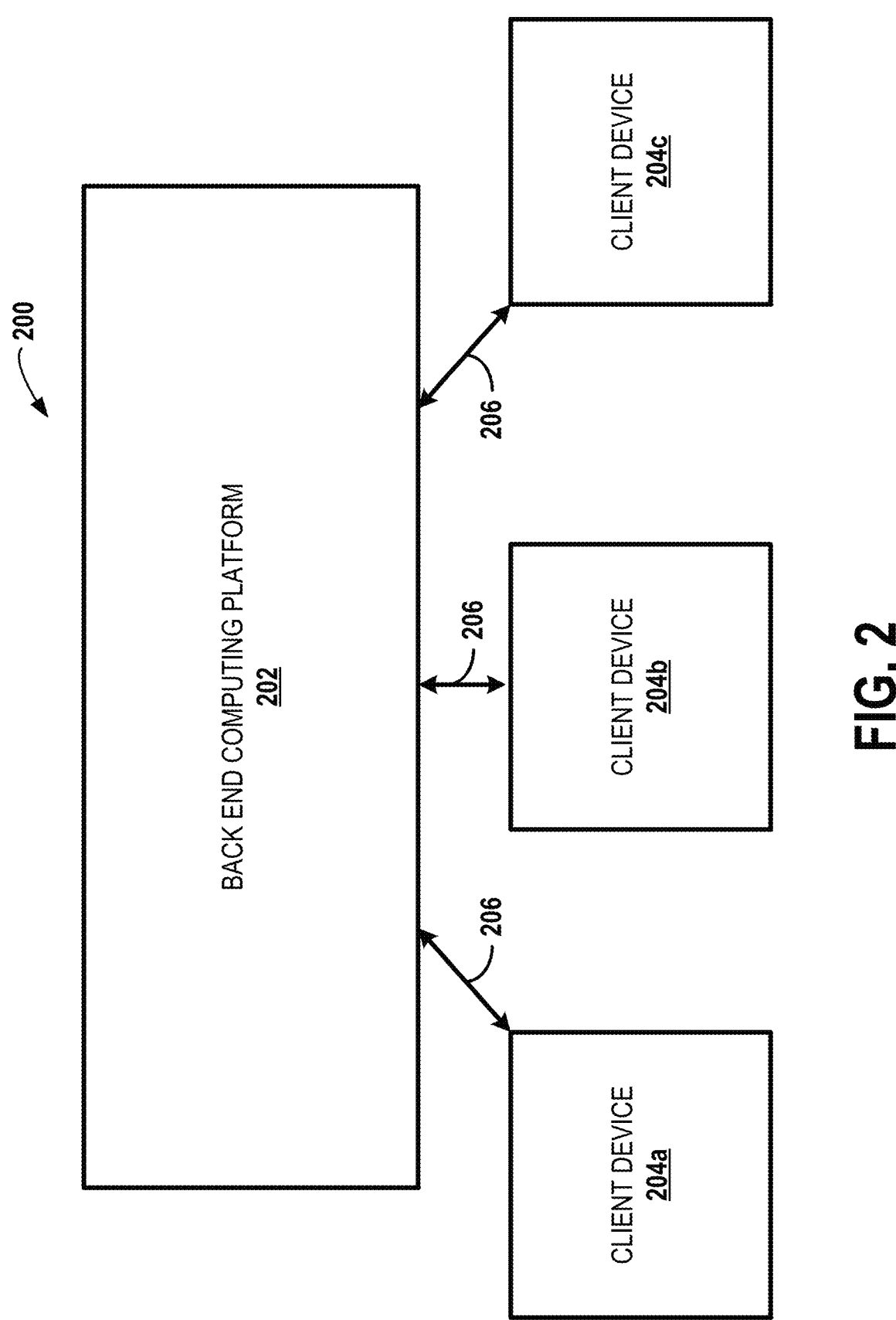
FIG. 2 is a block diagram for an example network environment in which a construction management software application may be implemented.

To illustrate, FIG. 2 shows an example network environment 200 in which a construction management software application comprising both front-end software and back-end software (which is sometimes referred to as a client-server application or a Software as a Service (SaaS) application) may be implemented. As shown in FIG. 2, the network environment 200 includes a back-end computing platform 202 that may be communicatively coupled to one or more client devices 204, which as shown includes the client device 204A, the client device 204B, and the client device 204C. Although the client devices 204 are depicted by three devices as shown for the sake of simplicity in illustration, it should be understood that the client devices 204 may represent more or less than three devices without departing from the spirit and scope of this disclosure.

Broadly speaking, the back-end computing platform 202 may comprise one or more computing systems that have been provisioned with back-end software for a construction management software application, which may include program code for carrying out one or more of the platform-side functions disclosed herein. The one or more computing systems of back-end computing platform 202 may collectively comprise some set of physical computing resources (e.g., one or more processors, data storage system, communication interfaces, etc.), which may take various forms and be arranged in various manners.

For instance, as one possibility, the back-end computing platform 202 may comprise computing infrastructure of a public, private, and/or hybrid cloud (e.g., computing and/or storage clusters) that has been provisioned with back-end software for the construction management software application. In this respect, the entity that owns and operates the back-end computing platform 202 may supply its own cloud infrastructure or obtain the cloud infrastructure from a third-party provider of "on demand" computing resources, such as Amazon Web Services (AWS) or the like. As another possibility, the back-end computing platform 202 may comprise one or more dedicated servers that have been provisioned with back-end software for the construction management software application.

Further, in practice, the back-end software installed at the back-end computing platform 202 may be implemented using any of various software architecture styles, examples of which may include a microservices architecture, a service-oriented architecture, and/or a serverless architecture, among other possibilities, as well as any of various deployment patterns, examples of which may include a container-based deployment pattern, a virtual-machine-based deployment pattern, and/or a Lambda-function-based deployment pattern, among other possibilities.

Further yet, although not shown in FIG. 2, the back-end software installed at the back-end computing platform 202 may interact with a data storage layer of the back-end computing platform 202, which may comprise data stores of various different forms, examples of which may include relational databases (e.g., Online Transactional Processing (OLTP) databases), NoSQL databases (e.g., columnar databases, document databases, key-value databases, graph databases, etc.), file-based data stores (e.g., Hadoop Distributed File System), object-based data stores (e.g., Amazon S3), data warehouses (which could be based on one or more of the foregoing types of data stores), data lakes (which could be based on one or more of the foregoing types of data stores), message queues, or streaming event queues, among other possibilities.

The back-end computing platform 202 may comprise various other components and take various other forms as well.

In turn, the client devices 204 may each be any computing device that is capable of running front-end software of the construction management software application, which may include program code for carrying out the client-side functions disclosed herein. In this respect, the client devices 204 may each include hardware components such as one or more processors, computer-readable mediums, communication interfaces, and input/output (I/O) components (or interfaces for connecting thereto), among others, as well as software components that facilitate the client device's ability to run the front-end software (e.g., operating system software, web browser software, etc.). As representative examples, the client devices 104 may each take the form of a desktop computer, a spatial computer, a laptop, a netbook, a tablet, a smartphone, and/or a personal digital assistant (PDA), among other possibilities.

As further depicted in FIG. 2, the back-end computing platform 202 is configured to interact with the client devices 204 over respective communication paths 206. In this respect, each communication path 206 between the back-end computing platform 202 and one of the client devices 204 may generally comprise one or more communication networks and/or communications links, which may take any of various forms. For instance, each respective communication path 206 with the back-end computing platform 202 may include any one or more of point-to-point links, Personal Area Networks (PANs), Local-Area Networks (LANs), Wide-Area Networks (WANs) such as the Internet or cellular networks, and/or cloud networks, among other possibilities. Further, the communication networks and/or links that make up each respective communication path 206 with the back-end computing platform 202 may be wireless, wired, or some combination thereof, and may carry data according to any of various different communication protocols. Further yet, communications over each respective communication path 206 could be carried out via an Application Programming Interface (API), among other possibilities. Still further, although not shown, the respective communication paths 206 between the client devices 204 and the back-end computing platform 202 may also include one or more intermediate systems. For example, it is possible that the back-end computing platform 202 may communicate with a given client device 204 via one or more intermediary systems, such as a host server (not shown). Many other environments are also possible.

Although not shown in FIG. 2, the back-end computing platform 1202 may also be configured to receive data, such as data related to a construction project, from one or more external data sources, such as an external database and/or another back-end computing platform or platforms. Such data sources—and the data output by such data sources—may take various forms.

It should be understood that the network environment 200 depicted in FIG. 2 is one example of a network environment in a construction management software application may be implemented. Numerous other arrangements are possible and contemplated herein. For instance, other network configurations may include additional components not pictured and/or more or fewer of the pictured components.

In line with the discussion above, one aspect of the disclosed technology involves a metric-level model that is configured to render metric-level predictions of a party's performance on a construction project, such as the metric-level models 101 illustrated in FIG. 1A. The functionality for creating and executing a metric-level model in accordance with the present disclosure may take any of various forms.

For instance, one possible implementation of functionality for creating a set of metric-level models in accordance with the present disclosure is illustrated in FIG. 3A. For purposes of illustration, the example functionality 300 of FIG. 3A is described as being carried out by the back-end computing platform 202 of FIG. 2, but it should be understood that the example functionality of FIG. 3A may be carried out by any computing platform that is capable of running the software disclosed herein. Further, it should be understood that the example functionality of FIG. 3A is merely described in this manner for the sake of clarity and explanation and that the example functionality may be implemented in various other manners, including the possibility that functions may be added, removed, rearranged into different orders, combined into fewer blocks, and/or separated into additional blocks depending upon the particular embodiment.

Prior to carrying out the functionality 300 of FIG. 3A, the back-end computing platform 202 may define certain parameters for the set of metric-level models that are to be created. For instance, as one possibility, the back-end computing platform 202 may define a given software tool for which the set of metric-level models are to be created. In this respect, the given software tool may comprise any software tool that may be included in a construction management software application, including but not limited to any of the example software tools described herein.

As another possibility, the back-end computing platform 202 may define a given set of metrics for which the set of the metric-level models are to be created. In this respect, a given set of metrics may comprise any metric that provides insight regarding a party's usage of the given software tool, including but not limited to any of the example metrics described herein. Additional examples of metrics for which metric-level models could be created are illustrated in the form of a table 315 in FIG. 3B. The table 315 includes column 316 for the tool-based metrics, which lists the names of each of a set of example metrics that may be the basis for one or more metric-level models (and/or the basis (or part of the basis) for any other models disclosed herein, such as a tool-based model, a product-based model, a project-based model, a party-based model, etc.). To the right of the column 316 for the set of example tool-based metrics, a column 317 is populated with brief descriptions for each of the set of example metrics that are named in the column 316. To the left of the column 316 for the names of each of the set of metrics, a column 318 lists example software tools that correlate with each of the set of example metrics of column 316, such that the example metric to the right of an example software tool is a metric associated with that example software tool. To the left of the column 318 for the example software tools, column 319 lists example software products that correlate with each of example software tools of column 318, such that an example software tool of column 318 is grouped as part of the example software product to the left of the example software tool.

As yet another possibility, the back-end computing platform 202 may define how the set of metric-level models will quantify project performance, such as by defining a given performance parameter that quantifies a party's performance on a construction project in terms of the party's-predicted ability to meet a timing goal, a budget goal, or a quality/safety goal.

In practice, the back-end computing platform 202 may determine these parameters based on user input that is provided via a client device 204, which may transmit data indicating such user input to the back-end computing platform 202.

Additionally, in advance of carrying out the functionality 300 of FIG. 3A, the back-end computing platform 202 may identify a universe of past construction projects for use in creating the set of metric-level models. In this respect, the identified universe of past construction projects may comprise any collection of past construction projects for which there is available project data that can be utilized as described herein. Further, in practice, the number of construction projects in the universe of past construction projects may be large enough that it would not be practically possible for a human to evaluate project data for such construction projects or otherwise carry out the functionality described herein without the use of a computer. For example, the universe of past construction projects could contain several hundreds or thousands of construction projects.

With the universe of past construction projects identified, the example functionality 300 may begin at block 302 with the back-end computing platform 202 obtaining past project data for each of the identified universe of past construction projects. In practice, this functionality for obtaining the past project data may comprise accessing and loading the past project data from a data storage layer of the back-end computing platform 202 and/or an external data source, among other possibilities. Further, the past project data that is obtained for each past construction project may comprise any project data that can be utilized to determine (i) data values for the given set of metrics and (ii) a data value for the given performance parameter.

At block 304, the back-end computing platform may utilize the past project data for each respective past construction project in the universe to determine, for the respective past construction project, (i) respective data values for the given set of metrics (which may be referred to herein as the "metric values" for the past construction project) and (ii) a respective data value for the given performance parameter which may be referred to as the "ground-truth performance parameter value" for the past construction project). Thus, as a result of this functionality, the back-end computing platform may generate a dataset comprising project-specific sets of metric values and corresponding ground-truth performance values across the universe of past construction projects. After generating the dataset comprising the project-specific sets of metric values and corresponding ground-truth performance values across the universe of past construction projects, the back-end computing platform 202 may then utilize that dataset to create a respective metric-level model for each metric in the given set of metrics. This functionality will be described below with reference to a single metric that is referred to as a "given metric," but it is to be understood that the functionality of blocks 306, 308, 310, 312 may be repeated for each of the given set of metrics to thereby generate a metric-level model for each of the given set of metrics.

To begin, the back-end computing platform 202 may extract, from the generated dataset, the metric values for the given metric and the corresponding ground-truth performance values across the universe of past construction projects.

At block 306, the back-end computing platform 202 may partition the metric values for the given metric across the universe of past construction projects into discrete ranges of metric values for the given metric. This partitioning function may take any of various forms. For instance, as one possibility, the back-end computing platform 202 may partition the metric values for the given metric into a given number of quantiles, such as four quantiles (e.g., quartiles). To illustrate with a specific example, if the metric values for the given metric range from 1 to 7, the back-end computing platform 202 may partition such metric values into a first quartile ranging from 1 to 3, a second quartile ranging from 3 to 3.5, a third quartile ranging from 3.5 to 5, and a fourth quartile ranging from 5 to 7. The partitioning function may take other forms as well.

At block 308, after the metric values for the given metric across the universe of past construction projects have been partitioned into discrete ranges, the back-end computing platform 202 may then group the universe of past construction projects into cohorts that correspond to the discrete ranges of values for the given tool-based metric. For instance, continuing with the specific example above, the back-end computing platform 202 may group past construction projects having metric values for the given metric that fall between 1 and 3 into a first cohort, group past construction projects having metric values for the given metric that fall between 3 and 3.5 into a second cohort, group past construction projects having metric values for the given metric that fall between 3.5 and 5 into a third cohort, and group past construction projects having metric values for the given metric that fall between 5 and 7 into a fourth cohort. Many other examples are possible as well.

At block 310, for each respective cohort of past construction projects created at block 308, the back-end computing platform 202 may utilize the ground-truth performance values for the past construction projects in the respective cohort to determine a respective performance value for the respective cohort that corresponds to the range of metric values for the respective cohort. This function of determining a respective cohort's performance value may involve applying an aggregation operation to the individual ground-truth performance values of the past construction projects in the respective cohort, such as by taking the mean or median of the individual ground-truth performance values, among various other possible ways to determine a respective cohort's performance value based on individual ground-truth performance values. To illustrate with a specific example, if a given cohort includes 5 past construction projects having individual ground-truth performance values of 1.1, 1.15, 1.2, 1.25, and 1.3, then the back-end computing platform 202 may determine that the given cohort's performance value is 1.2 (i.e., the mean or median of such individual values). Many other examples are possible as well.

As a result of the functionality of block 310, the back-end computing platform 202 may have, for each respective range of metric values for the given metric that is determined at block 306, a corresponding performance value that is determined based on the cohort of past construction projects having metric values that fall within the respective range. For instance, continuing with the specific example above, the first range of metric values from 1 to 3 may have a first performance value, the second range of metric values from 3 to 3.5 may have a second performance value, the third range of metric values from 3.5 to 5 may have a third performance value, the fourth range of metric values from 5 to 7 may have a fourth performance value. Further, based on these performance values, the back-end computing platform 202 may assign performance comparison values to the different ranges to indicate how the ranges compare to one another in terms of performance on a construction project, such as percentile, quantile, ranking, or score values. For example, the range with the best performance value may be assigned a performance comparison value of 4, the range with the second-best performance value may be assigned a performance comparison value of 3, and so on.

At block 312, the back-end computing platform 202 may then encode the ranges of the metric values for the given metric and the corresponding performance values and/or comparison values for such ranges into a metric-level model for the given metric that is configured to (i) receive a value for the given metric that is determined based on a given party's usage of a given software tool on a given construction project and (ii) based on an evaluation of the received value, generate and output a metric-level prediction of the given party's performance on the given construction project.

As mentioned above, the foregoing steps for creating a metric-level model may be repeated for each metric of interest in the given set of metrics.

The functionality for creating a set of metric-level models in accordance with the present disclosure may take other forms as well. For instance, instead of partitioning the metric values for the given metric into discrete ranges, grouping projects into cohorts, and determining performance values for the cohorts, the metric values and corresponding performance values for the universe of past construction projects may be utilized to fit a curve and then represent that curve in the form of a metric-level model.

Further, while the foregoing functionality is described in the context of creating a set of metric-level models that predicts performance in terms of one given performance parameter, it should be understood that the foregoing functionality may be utilized to create multiple sets of metric-level models that are configured to predict performance in terms of multiple different performance parameters, such as (i) a first set of metric-level models that are configured to predict performance in terms of a first performance parameter that quantifies performance in terms of meeting a timing goal, (ii) a second set of metric-level models that are configured to predict performance in terms of a second performance parameter that quantifies performance in terms of meeting a budget goal, and/or (iii) a third set of metric-level models that are configured to predict performance in terms of a third performance parameter that quantifies performance in terms of meeting a quality/safety goal, among various other possibilities.

After the set of metric-level models has been created for the given set of metrics (e.g., via the functionality 300 of FIG. 3A), the set of metric-level models may then be utilized to generate predictions of a party's performance on a given construction project, which may in turn be utilized to generate one or more insights related to the party's usage of the construction management software application (e.g., usage recommendations for the one or more software tools). One possible implementation of such functionality is illustrated in FIG. 3C. For purposes of illustration, the example functionality 320 of FIG. 3C is described as being carried out by the back-end computing platform 202 of FIG. 2, but it should be understood that the example functionality of FIG. 3C may be carried out by any computing platform that is capable of running the software disclosed herein. Further, it should be understood that the example functionality of FIG. 3C is merely described in this manner for the sake of clarity and explanation and that the example functionality may be implemented in various other manners, including the possibility that functions may be added, removed, rearranged into different orders, combined into fewer blocks, and/or separated into additional blocks depending upon the particular embodiment.

The example functionality 320 may begin at block 322 with the back-end computing platform 202 obtaining project data for the given construction project on which a party's performance is to be evaluated by the set of metric-level models. In practice, this functionality for obtaining the project data may comprise accessing and loading the project data for the given construction project from a data storage layer of the back-end computing platform 202 and/or an external data source. Obtaining the project data for a given construction project may be performed in a variety of other ways and may take various forms. Further, in practice, the project data that is obtained for the given construction project may comprise any project data that can be utilized to determine data values for the given set of metrics.

At block 324, the back-end computing platform 202 may utilize the project data for the given construction project to determine a respective value for each respective metric in the given set of metrics. This function may take any of various forms depending on the form of the project data and the form of the respective metric for which the respective value is being determined.

At block 326, for each respective metric in the given set of metrics, the back-end computing platform 202 may input the respective value determined for the respective metric into the respective metric-level model for the respective metric, which may function to render and output a respective metric-level prediction of the party's performance on the given construction project that is based on the respective metric value.

In line with the discussion above, each such metric-level model may comprise encoded ranges of metric values for a respective metric along with corresponding performance values for the ranges, and in operation, the metric-level model may render a metric-level prediction of the party's performance on the given construction project by (i) receiving, as input, the respective value determined for the respective metric, (ii) identifying which range of metric values for the respective metric encompasses the respective value, and (iii) rendering a prediction of the party's performance on the given construction project that is based on the performance value corresponding to the identified range of metric values. In this respect, the prediction of the party's performance may comprise (i) the performance value itself and/or (ii) a comparison value that quantifies how the identified range compares to the other ranges in terms of performance on a construction project (e.g., a percentile or quantile value), among other possibilities.

At block 328, the back-end computing platform 202 may then input the respective metric-level predictions of the party's performance that are output by the set of metric-level models into a recommender engine and thereby cause the recommender engine to output one or more recommendations for improving the party's performance on the given construction project by changing how the party uses the one or more software tools. For example, the recommender engine may evaluate the respective prediction output by each of the respective metric-level models for the one or more software tools to identify the tool-specific metrics associated with the lowest performance predictions (e.g., prediction(s) that fall within lower percentiles for performance), and, then, generate one or more recommendations for changing the usage behavior for the one or more software tools so as to change the values of the identified metrics in a positive way.

In some examples, the recommender engine may employ respective weights that are applied to the respective predictions output by the set of metric-level models, when generating the one or more usage recommendations. For example, a first metric for a given software tool may have been seen to have a greater impact on some performance parameter than a second metric for the given software tool; thus, the recommender engine may give the prediction output based on the first metric a greater respective weight than the prediction output based on the second metric when generating the one or more usage recommendations associated with the given software tool.

In practice, the recommender engine may comprise a data science model that is configured to output usage recommendations for the one or more software tools based on metric-level predictions. For instance, the recommender engine may take the form of a rules-based model or a trained machine-learning model (e.g., a large language model), among other possibilities.

Further, in practice, outputting one or more usage recommendations may take the form of the back-end computing platform 202 causing a client device 204, which is loaded with and running the construction management software application, to present a user of the client device 204 with the one or more usage recommendations via one or more graphic user interface(s) (GUI(s)) within the construction management software application. In some example implementations, such outputting of the one or more usage recommendations may take the form of a visual notification (e.g., a text box, a visual pop up, a video overlay, a sidebar etc.) that is presented within the construction management software application. Further still, such a visual notification may take the form of a notification that is within (e.g., an overlay, prompt, etc.) or adjacent to (e.g. a sidebar) a specific software tool of the construction management application and, in some such examples, the one or more usage recommendations may be related to usage of the specific software tool. The one or more usage recommendations may take various other forms (e.g., an audible presentation, etc.), as well.

Example recommendations for usage of the one or more software tools that are generated based on the metric-level prediction output by the set of metric-level models may take various forms, which may depend in part on the software tool with which a recommendation is associated. For example, a metric-level model may be configured to generate a metric-level prediction of a party's performance on a construction project based on a "usage rate" metric for a Daily Logs tool; in such an example, based on the metric-level prediction, a recommendation may be output that suggests the party increase its usage of the Daily Logs tool to improve performance on the construction project. In another example, a metric-level model may be configured to generate a metric-level prediction of a party's performance on a construction project based on an "inspection time" metric for an Inspections software tool; in such an example, based on the metric-level prediction, a recommendation may be output that suggests the party take more time during inspections to improve performance on the construction project. In yet another example, a metric-level model may be configured to generate a metric-level prediction of a party's performance on a construction project based on an "average RFI response time" metric for an RFI software tool; in such an example, based on the metric-level prediction, a recommendation may be output that suggests the party decrease its RFI response time so as to complete a higher percentage of RFIs on time and thereby improve performance on the construction project. Many other examples are possible as well.

Additionally, the metric-level predictions of a set of metric-level models for a given software tool may be utilized by a recommender engine to generate insights related to the given software tool. For instance, as one possible implementation, a recommender engine may utilize the metric-level predictions of the set of metric-level models along with target values or ranges for the metrics (e.g., best-practice ranges) to determine one or both of (i) the "realized value" of each metric and/or (ii) the "unrealized value" of each metric. In turn, the recommender engine may optionally weight the realized and/or unrealized values determined for each metric and then use the resulting values to identify which one or more metrics have the highest or lowest realized value and/or which one or more metrics have the highest or lowest unrealized value, which may then form the basis for the recommendations that are presented.

The functionality for utilizing a metric-level model in accordance with the present disclosure may take other forms as well.

In line with the discussion above, another aspect of the disclosed technology involves a tool-level model that is configured to render tool-level predictions of a party's performance on a construction project, such as the tool-level model 120 illustrated in FIG. 1B. The functionality for creating and executing a tool-level model in accordance with the present disclosure may take any of various forms.

For instance, one possible implementation of functionality for creating a tool-level model in accordance with the present disclosure is illustrated in FIG. 4A. For purposes of illustration, the example functionality 400 of FIG. 4A is described as being carried out by the back-end computing platform 202 of FIG. 2, but it should be understood that the example functionality of FIG. 4A may be carried out by any computing platform that is capable of running the software disclosed herein. Further, it should be understood that the example functionality of FIG. 4A is merely described in this manner for the sake of clarity and explanation and that the example functionality may be implemented in various other manners, including the possibility that functions may be added, removed, rearranged into different orders, combined into fewer blocks, and/or separated into additional blocks depending upon the particular embodiment.

Prior to carrying out the functionality 400 of FIG. 4A, the back-end computing platform 202 may define certain parameters for the tool-level model that is to be created. For instance, as one possibility, the back-end computing platform 202 may define a given software tool for which the tool-level model is to be created. In this respect, the given software tool may comprise any software tool that may be included in a construction management software application, including but not limited to any of the example software tools described herein.

As another possibility, the back-end computing platform 202 may define a given set of metrics associated with the given software tool. In this respect, the given set of metrics may comprise any metric that provides insight regarding a party's usage of the given software tool, including but not limited to any of the example metrics described herein (e.g., the metrics described with reference to the table 315 in FIG. 3B).

As yet another possibility, the back-end computing platform 202 may define how the tool-level model will quantify project performance, such as by defining a given performance parameter that quantifies a party's performance on a construction project in terms of the party's predicted ability to meet a timing goal, a budget goal, or a quality/safety goal, among other possibilities.

In practice, the back-end computing platform 202 may define these parameters based on user input that is provided via a client device 204, which may transmit data indicating such user input to the back-end computing platform 202.

Additionally, in advance of carrying out the functionality 400 of FIG. 4A, the back-end computing platform 202 may identify a universe of past construction projects for use in creating the tool-level model. In this respect, the identified universe of past construction projects may comprise any set of past construction projects for which there is available project data that can be utilized as described herein. Further, in practice, the number of construction projects in the universe of past construction projects may be large enough that it would not be practically possible for a human to evaluate project data for such construction projects or otherwise carry out the functionality described herein without the use of a computer. For example, the universe of past construction projects could contain several hundreds or thousands of construction projects.

With the universe of past construction projects identified, the example functionality 400 may begin at block 402 with the back-end computing platform 202 obtaining past project data for each of the identified universe of past construction projects. In practice, this functionality for obtaining the past project data may comprise accessing and loading the past project data from a data storage layer of the back-end computing platform 202 and/or an external data source, among other possibilities. Further, the past project data that is obtained for each past construction project may comprise any project data that can be utilized to determine (i) data values for the given set of metrics, and (ii) a data value for a given performance parameter.

At block 404, the back-end computing platform 202 may utilize the obtained past project data for each respective past construction project in the universe to generate a training dataset for training the tool-level model. In at least some implementations, this training dataset may comprise, for each respective past construction project in the universe of past construction projects, (i) respective "metric-level input values" for the given set of metrics, which may comprise the determined metric values for the given set of metrics or metric-level predictions for the given set of metrics that are output by metric-level models, (ii) a respective data value for the given performance parameter (which may be referred to as the "ground-truth performance parameter value" for the past construction project), and (iii) a data value for a comparison parameter (e.g., a percentile or quantile) that indicates how the ground-truth performance parameter value for the respective past construction project compares to the ground-truth performance parameter values for the other past construction projects (which maybe be referred as the "ground-truth performance comparison value" for the past construction project). In this respect, for each respective past construction project in the universe, the back-end computing platform 202 may utilize the project's past project data to determine the metric values for the given set of metrics, the ground-truth performance parameter value, and the ground-truth performance comparison value, and then may also utilize the determined metric values and a set of metric-level models for the given set of metrics to produce metric-level predictions for the given set of metrics.

Thus, as a result of this functionality, the back-end computing platform 202 may generate the training dataset comprising project-specific sets of metric-level input values and corresponding ground-truth performance parameter values and performance comparison values across the universe of past construction projects. Further, in practice, the training data for each respective past construction project may be framed in terms of an "input-label pair" in which (i) the input values comprise the metric-level input values determined for the respective past construction project and (ii) the label values comprise one or both of the ground-truth performance parameter value and/or the ground-truth performance comparison value (e.g., a percentile or quantile value).

At block 406, after generating the training dataset for the tool-level model, the back-end computing platform 202 may apply a machine-learning process to the training dataset in order to train at least one machine-learning model that is configured to render and output a tool-level prediction of a party's performance on a given construction project of interest that is based on the party's usage of the given software tool (e.g., as reflected by the given set of metrics). Such a machine-learning model may take any of various forms.

To begin, the input of the trained machine-learning model may comprise (i) a first set of metric-level input values (e.g., metric values or metric-level predictions such as predicted performance or comparison values for the given set of metrics) for the given construction project of interest and (ii) a respective set of metric-level input values (e.g., metric values or metric-level predictions such as predicted performance or comparison values for the given set of metrics) for each of a universe of reference projects, which may comprise any collection of construction projects for which there is available project data that can be utilized to determine metric values for the given set of metrics. In this respect, the universe of reference construction projects that are utilized as the input of the trained machine-learning model could include some or all of the universe of past construction projects that is utilized to train the machine-learning model, and may also include other construction projects that were not included in the universe of past construction projects (e.g., ongoing construction projects, simulated construction projects, etc.). The input of the trained machine-learning model may take other forms as well.

Further, the output of the trained machine-learning model may comprise, for the given construction project of interest and perhaps also each of the reference construction projects, one or both of (i) a predicted performance value of the given performance parameter, which quantifies the performance on the given or reference construction project in terms of a predicted ability to meet a timing goal, a budget goal, or a quality and/or quality/safety goal, and/or (ii) a predicted comparison value (e.g., percentile or quantile value) that quantifies the performance on the given or reference construction project relative to the performance on the other construction projects for which data is input to the machine-learning model. The output of the trained machine-learning model may take other forms as well.

Further yet, the machine-learning model that is trained by the machine-learning process may comprise any type of machine-learning model now known or later developed, examples of which may include a regression model, a decision-tree-based model (e.g., a gradient boosting model, random forest model, etc.), a support vector machines ("SVM")-based model, a Bayesian model, a k-Nearest Neighbor ("kNN") model, a Gaussian process model, a deep learning model (e.g., a feedforward, recurrent, or convolution neural-network model, a generative adversarial network ("GAN") model, an autoencoder-based model, a transformer-based model, etc.), a clustering model, an association-rule model, a dimensionality-reduction model, and/or a reinforcement-learning model, among other possible examples of models that can be created using machine-learning techniques.

In some implementations, the back-end computing platform 202 may be configured to train a single machine-learning model of the form described above, in which case that single machine-learning model may be utilized as the tool-level model. Alternatively, in other implementations, the back-end computing platform 202 may be configured to train multiple different machine-learning models of the form described above (e.g., utilizing different sets of hyperparameters), in which case the back-end computing platform 202 may then select a given one of those machine-learning models to utilize as the tool-level model. To accomplish this, the back-end computing platform 202 may evaluate the performance of the different machine-learning models utilizing a validation dataset (or sometimes referred to as a "test dataset") that has a similar form to the generated training dataset.

Further, in at least some implementations, the back-end computing platform 202 may be configured to periodically re-train the tool-level model based on updated training data. For instance, after a given period of time has passed (e.g., a month) and project data for additional past construction projects has become available, the back-end computing platform 202 may be configured to utilize the project data for additional past construction projects to re-train the tool-level model.

The functionality for creating a tool-level model in accordance with the present disclosure may take other forms as well.

Further, while the foregoing functionality is described in the context of creating a single tool-level model for one given software tool, it should be understood that the foregoing functionality 400 for creating a tool-level model may be utilized to create tool-level models for multiple different software tools.

Further yet, while the foregoing functionality is described in the context of creating a tool-level model for a given software tool that predicts performance in terms of one given performance parameter, it should be understood that the foregoing functionality may be utilized to create multiple tool-level models for a given software tool that are configured to predict performance in terms of multiple different performance parameters, such as (i) a first tool-level model that is configured to predict performance in terms of a first performance parameter that quantifies performance in terms of meeting a timing goal, (ii) a second tool-level model that is configured to predict performance in terms of a second performance parameter that quantifies performance in terms of meeting a budget goal, and/or (iii) a third tool-level model that is configured to predict performance in terms of a third performance parameter that quantifies performance in terms of meeting a quality/safety goal, among various other possibilities.

After the tool-level model has been created for the given software tool (e.g., via the functionality 400 of FIG. 4A), the tool-level model may then be utilized to generate a prediction of a party's performance on a given construction project, which may in turn be utilized to generate one or more insights related to the party's usage of the construction management software application (e.g., usage recommendations for the given software tool).

Figure 4B:
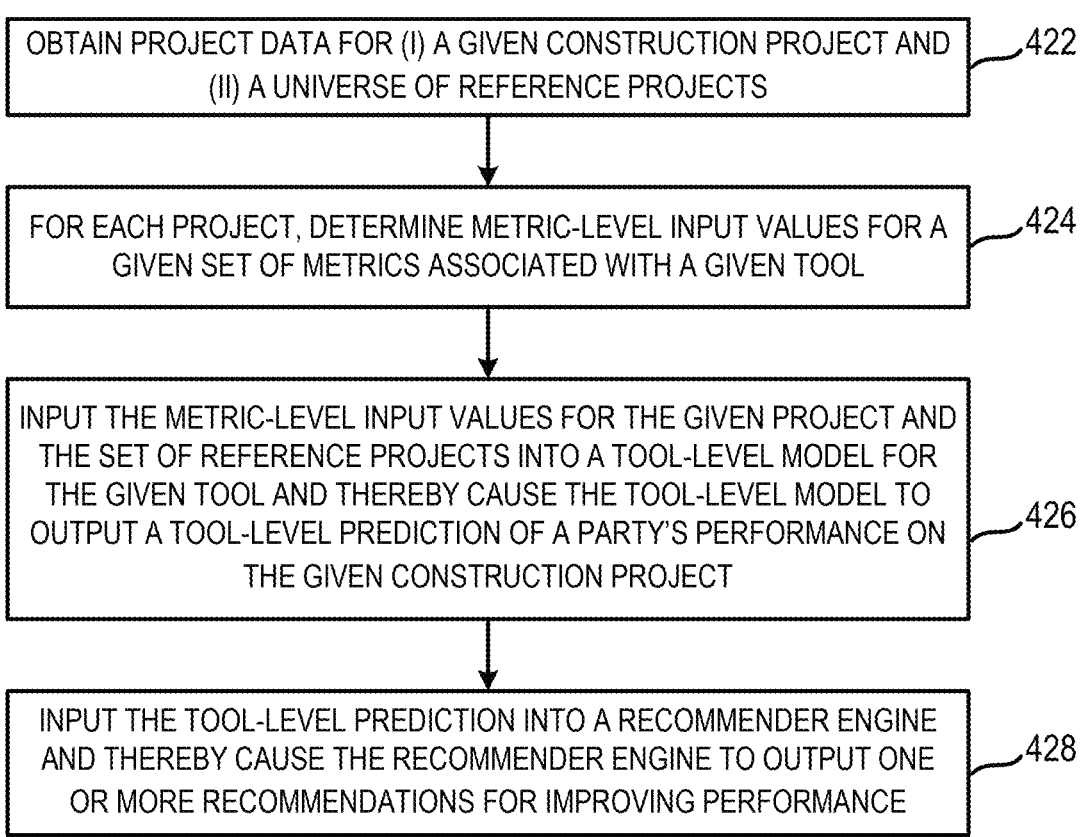
FIG. 4B is a flowchart for one possible implementation of functionality for utilizing a tool-level model to generate a prediction of a party's performance on a given construction project.

One possible implementation of that functionality is illustrated in FIG. 4B. For purposes of illustration, the example functionality 420 of FIG. 4B is described as being carried out by the back-end computing platform 202 of FIG. 2, but it should be understood that the example functionality of FIG. 4B may be carried out by any computing platform that is capable of running the software disclosed herein. Further, it should be understood that the example functionality of FIG. 4B is merely described in this manner for the sake of clarity and explanation and that the example functionality may be implemented in various other manners, including the possibility that functions may be added, removed, rearranged into different orders, combined into fewer blocks, and/or separated into additional blocks depending upon the particular embodiment.

The example functionality 420 may begin at block 422 with the back-end computing platform 202 obtaining project data for (i) the given construction project and (ii) a universe of reference construction projects. In practice, this functionality for obtaining the project data for the given construction project and the universe of reference construction projects may comprise accessing and loading the project data from one or more data storage layers of the back-end computing platform 202 and/or an external data source. Obtaining the project data may be performed in a variety of other ways and may take various forms. Further, in practice, the project data that is obtained for the given construction project and the reference construction projects may comprise any project data that can be utilized to determine data values for the given set of metrics.

At block 424, the back-end computing platform 202 may utilize the project data to determine (i) a first set of metric-level input values for the given construction project and (ii) a respective set of metric-level input values for each reference project. This function may take any of various forms depending on the form of the project data and the form of the metric-level input values. In line with the discussion above, such metric-level input values may comprise either metric values for the given set of metrics or metric-level predictions that are output by a set of metric-level models for the given set of metrics (e.g., predicted performance values and/or predicted comparison values), among other possibilities.

At block 426, the back-end computing platform 202 may input the first and respective sets of metric-level input values determined at block 424 into the tool-level model, which may function to render and output a tool-level prediction of the party's performance on the given construction project that is based on the party's usage of the given software tool. In line with the discussion above, this tool-level prediction of the party's performance on the given construction project may comprise one or both of (i) a predicted performance value of the given performance parameter, which quantifies the performance on the given construction project in terms of a predicted ability to meet a timing goal, a budget goal, or a quality/safety goal, and/or (ii) a predicted comparison value (e.g., percentile or quantile value) that quantifies the party's performance on the given construction project relative to the performance on the reference construction projects.

Further, in line with the discussion above, the tool-level model may additionally function to render and output a respective tool-level prediction of the performance on each respective reference construction project, which may comprise one or both of (i) a predicted performance value of the given performance parameter, which quantifies a reference party's performance on the respective reference construction project in terms of a predicted ability to meet a timing goal, a budget goal, or a quality/safety goal, and/or (ii) a predicted comparison value (e.g., percentile or quantile value) that quantifies the reference party's performance on the respective reference construction project relative to the performance on the other reference construction projects (and the given construction project).

At block 428, the back-end computing platform 202 may then input the tool-level prediction of the party's performance into a recommender engine (perhaps along with tool-level predictions output by other tool-level models) and thereby cause the recommender engine to output one or more recommendations for improving the party's performance on the given construction project by changing how the party uses the given software tool (and/or other software tools).

For example, the recommender engine may evaluate the tool-level prediction output by the tool-level model for the given software tool (perhaps along with tool-level predictions output by other tool-level models), and if that tool-level prediction indicates that the party's usage of the given software tool is not within expectations for the given software tool (e.g., based on a target value or range for the given software tool), then the recommender engine may generate one or more recommendations for ways to improve usage of the given software tool (e.g., based on a list of best practices for using the given software tool).

Additionally, the tool-level predictions of a set of tool-level models may be utilized by a recommender engine to generate insights related to multiple software tools. For instance, as one possible implementation, a recommender engine may utilize the tool-level predictions of the set of tool-level models along with target values or ranges for the software tools (e.g., best-practice ranges) to determine one or both of (i) the "realized value" of each software tool and/or (ii) the "unrealized value" of each software tool. In turn, the recommender engine may optionally weight the realized and/or unrealized values determined for each software tool and then use the resulting values to identify which one or more software tools have the highest or lowest realized value and/or which one or more software tools have the highest or lowest unrealized value, which may then form the basis for the recommendations that are presented.

In practice, the recommender engine may comprise a data science model that is configured to output usage recommendations for the given software tool (and perhaps other software tools) based on tool-level predictions. For instance, the recommender engine may take the form of a rules-based model or a trained machine-learning model (e.g., a large language model), among other possibilities.

Further, in practice, outputting one or more usage recommendations may take the form of the back-end computing platform 202 causing a client device 204, which is loaded with and running the construction management software application, to present a user of the client device 204 with the one or more usage recommendations via one or more GUI(s) within the construction management software application. In some example implementations, such outputting of the one or more usage recommendations may take the form of a visual notification (e.g., a text box, a visual pop up, a video overlay, a sidebar etc.) that is presented within the construction management software application. Further still, such a visual notification may take the form of a notification that is within (e.g., an overlay, prompt, etc.) or adjacent to (e.g. a sidebar) a specific software tool of the construction management software application and, in some such examples, the one or more usage recommendations may be related to usage of the specific software tool. The one or more usage recommendations may take various other forms (e.g., an audible presentation, etc.), as well.

The functionality for utilizing a tool-level model in accordance with the present disclosure may take other forms as well.

Referring again to the discussion above, yet another aspect of the disclosed technology involves a product-level model that is configured to render product-level predictions of a party's performance on a construction project, such as the product-level model 130 illustrated in FIG. 1C. The functionality for creating and executing a product-level model in accordance with the present disclosure may take any of various forms.

For instance, one possible implementation of functionality for creating a product-level model in accordance with the present disclosure is illustrated in FIG. 5A. For purposes of illustration, the example functionality 500 of FIG. 5A is described as being carried out by the back-end computing platform 202 of FIG. 2, but it should be understood that the example functionality of FIG. 5A may be carried out by any computing platform that is capable of running the software disclosed herein. Further, it should be understood that the example functionality of FIG. 5A is merely described in this manner for the sake of clarity and explanation and that the example functionality may be implemented in various other manners, including the possibility that functions may be added, removed, rearranged into different orders, combined into fewer blocks, and/or separated into additional blocks depending upon the particular embodiment.

Prior to carrying out the functionality 500 of FIG. 5A, the back-end computing platform 202 may define certain parameters for the product-level model that is to be created. For instance, as one possibility, the back-end computing platform 202 may define a given software product for which the product-level model is to be created. In this respect, the given software product may comprise any software product that may be included in a construction management software application, including but not limited to any of the example software products described herein.

As another possibility, the back-end computing platform 202 may define a given set of software tools that are included as part of the given software product and are to form the basis for the product-level model. In this respect, the set of software tools may comprise the entire set of software tools that are included as part of the given software product, or some subset thereof.

As yet another possibility, the back-end computing platform 202 may define a given set of metrics that are associated with the given software product. In this respect, the given set of metrics may comprise any metric that provides insight regarding a party's usage of a software tool that is included as part of the given software product, including but not limited to any of the example metrics described herein (e.g., the metrics described with reference to the table 315 of FIG. 3B).

As still another possibility, the back-end computing platform 202 may define how the product-level model will quantify project performance by defining a given performance parameter that quantifies a party's performance on a construction project in terms of the party's predicted ability to meet a timing goal, a budget goal, or a quality/safety goal, among other possibilities.

In practice, the back-end computing platform 202 may define these parameters based on user input that is provided via a client device 204, which may transmit data indicating such user input to the back-end computing platform. Further, in practice, the back-end computing platform 202 may be configured to define the parameters for the tool-level models first and may then define the parameters for the product-level model based on the parameters that have previously been defined for the tool-level models. For example, the back-end computing platform 202 may first define the metrics that serve as inputs to the tool-level models for the given software product's given set of software tools and may then define the given software product's given set of metrics to be a superset of the metrics defined for the tool-level models. As another example, the back-end computing platform 202 may first define the given performance parameter to be output by the tool-level models and may then define the given software product's given performance parameter to be the same as the given performance parameter to be output by the tool-level models such that both types of models quantify performance in the same way. Other examples are possible as well.

Additionally, in advance of carrying out the functionality 500 of FIG. 5A, the back-end computing platform 202 may carry out the functionality 400 of FIG. 4A for each software tool in the given set of software tools for the given software product. Thus, as a result of that functionality, the back-end computing platform 202 may have, for each respective software tool in the given set of software tools, (i) a respective tool-level model that was created for the respective software tool and (ii) a respective tool-level training dataset that was generated based on project data for a common universe of past construction projects (i.e., a collection of past construction projects that was common across the given set of software tools) and was thereafter utilized to train the respective tool-level model.

The functionality 500 may then begin at block 502 with the back-end computing platform 202 accessing the respective tool-level training datasets that were previously generated for the respective software tools in the given set of software tools.

In line with the discussion above, each of these tool-level training datasets may comprise, for each respective past construction project in the universe of past construction projects, (i) respective data values for a respective set of metrics associated with the respective software tool (which may be referred to herein as the "tool-level metric values" for the past construction project), (ii) a respective data value for the given performance parameter (which may be referred to as the "ground-truth performance parameter value" for the past construction project), and (iii) a data value for a comparison parameter (e.g., percentile or quantile) that indicates how the ground-truth performance parameter value for the respective past construction project compares to the ground-truth performance parameter values for the other past construction projects (which maybe be referred as the "ground-truth performance comparison value" for the past construction project). However, the tool-level training datasets may take other forms as well.

It should also be understood that, instead of accessing the respective tool-level training datasets that were previously generated for the respective software tools in the given set of software tools, the back-end computing platform 202 may generate those datasets by carrying out functionality similar to that described with reference to blocks 402 and 404 for each of the software tools in the given set of software tools.

At block 504, the back-end computing platform 202 may utilize the respective tool-level training datasets and the respective tool-level models for the given set of software tools to generate respective sets of tool-level predictions for the past construction projects in the common universe of past construction projects. To accomplish this for a given software tool, the back-end computing platform 202 may input the respective set of tool-level metric values determined for each past construction project into the tool-level model for the given software tool, which may function to render and output a respective tool-level prediction of performance on the past construction project. The back-end computing platform 202 may repeat this functionality for each software tool in the given set of software tools, which may produce, for each respective past construction project in the common universe of past construction projects, a respective group of tool-level predictions of performance on the respective past construction project.

At block 506, the back-end computing platform 202 may generate a product-level training dataset for the given software product that comprises, for each respective past construction project in the common universe of past construction projects, (i) a respective group of tool-level predictions of performance on the respective past construction projects that were produced utilizing the tool-level models for the software tools in the given set of software tools, (ii) the ground-truth performance parameter value for the past construction project (which was included within the tool-level training datasets), and (iii) the ground-truth performance comparison value for the past construction project (which was included within the tool-level training datasets). In this respect, in practice, the training data for each respective past construction project may be framed in terms of an "input-label pair" in which (i) the input values comprise the group of tool-level predictions of performance on the respective past construction project and (ii) the label values comprise one or both of the ground-truth performance parameter value and/or the ground-truth performance comparison value (e.g., a percentile or quantile value)

At block 508, after generating the training dataset for the product-level model, the back-end computing platform 202 may apply a machine-learning process to the training dataset in order to train at least one machine-learning model that is configured to render and output a product-level prediction of a party's performance on a given construction project of interest that is based on the party's usage of the given software product. Such a machine-learning model may take any of various forms.

To begin, the input of the trained machine-learning model may comprise (i) a first group of tool-level predictions for the given construction project that are produced by the tool-level models for the given set of software tools and (ii) a respective group of tool-level predictions for each of a universe of reference construction projects that are produced by the tool-level models for the given set of software tools, where the universe of reference construction projects may comprise any collection of construction projects for which there is available project data that can be utilized to render tool-level predictions. And in line with the foregoing discussion of the outputs of the tool-level models, each such tool-level prediction that is provided as input to the trained machine-learning model may comprise one or both of (i) a predicted value of the given performance parameter for the respective past construction project and/or (ii) a predicted comparison value (e.g., percentile or quantile value) for the respective past construction project.

Further, the output of the trained machine-learning model may comprise, for the given construction project of interest and perhaps also each of the reference construction projects, one or both of (i) a predicted performance value of the given performance parameter, which quantifies the performance on the given or reference construction project in terms of a predicted ability to meet a timing goal, a budget goal, or a quality/safety goal, and/or (ii) a predicted comparison value (e.g., percentile or quantile value) that quantifies the performance on the given or reference construction project relative to the performance on the other construction projects for which data is input to the machine-learning model. The output of the trained machine-learning model may take other forms as well.

Further yet, the machine-learning model that is trained by the machine-learning process may comprise any type of machine-learning model now known or later developed, examples of which may include a regression model, a decision-tree-based model (e.g., a gradient boosting model, random forest model, etc.), SVM-based model, a Bayesian model, a kNN model, a Gaussian process model, a deep learning model (e.g., a feedforward, recurrent, or convolution neural-network model, a GAN model, an autoencoder-based model, a transformer-based model, etc.), a clustering model, an association-rule model, a dimensionality-reduction model, and/or a reinforcement-learning model, among other possible examples of models that can be created using machine-learning techniques.

In some implementations, the back-end computing platform 202 may be configured to train a single machine-learning model of the form described above, in which case that single machine-learning model may be utilized as the product-level model. Alternatively, in other implementations, the back-end computing platform 202 may be configured to train multiple different machine-learning models of the form described above (e.g., utilizing different sets of hyperparameters), in which case the back-end computing platform 202 may then select a given one of those machine-learning models to utilize as the product-level model. To accomplish this, the back-end computing platform 202 may evaluate the performance of the different machine-learning models utilizing a validation dataset (or sometimes referred to as a "test dataset") that has a similar form to the generated training dataset for the product-level model.

Further, in at least some implementations, the back-end computing platform 202 may be configured to periodically re-train the product-level model based on updated training data. For instance, after a given period of time has passed (e.g., a month) and project data for additional past construction projects has become available, the back-end computing platform 202 may be configured to utilize the project data for additional past construction projects to re-train the product-level model.

The functionality for creating a product-level models in accordance with the present disclosure may take other forms as well.

Further, while the foregoing functionality is described in the context of creating a single product-level model for one given software product, it should be understood that the foregoing functionality 500 for creating a product-level model may be utilized to create product-level models for multiple different software products.

Further yet, while the foregoing functionality is described in the context of creating a product-level model for a given software product that predicts performance in terms of one given performance parameter, it should be understood that the foregoing functionality may be utilized to create multiple product-level models for a given software product that are configured to predict performance in terms of multiple different performance parameters, such as (i) a first product-level model that is configured to predict performance in terms of a first performance parameter that quantifies performance in terms of meeting a timing goal, (ii) a second product-level model that is configured to predict performance in terms of a second performance parameter that quantifies performance in terms of meeting a budget goal, and/or (iii) a third product-level model that is configured to predict performance in terms of a third performance parameter that quantifies performance in terms of meeting a quality/safety goal, among various other possibilities.

After the product-level model has been created for the given software product (e.g., via the functionality 500 of FIG. 5A), the product-level model may then be utilized to generate a prediction of a party's performance on a given construction project of interest, which may in turn be utilized to generate one or more insights related to the party's usage of the construction management software application (e.g., usage recommendations for the given software product).

One possible implementation of that functionality is illustrated in FIG. 5B. For purposes of illustration, the example functionality 520 of FIG. 5B is described as being carried out by the back-end computing platform 202 of FIG. 2, but it should be understood that the example functionality of FIG. 5B may be carried out by any computing platform that is capable of running the software disclosed herein. Further, it should be understood that the example functionality of FIG. 5B is merely described in this manner for the sake of clarity and explanation and that the example functionality may be implemented in various other manners, including the possibility that functions may be added, removed, rear-ranged into different orders, combined into fewer blocks, and/or separated into additional blocks depending upon the particular embodiment.

The example functionality 520 may begin at block 522 with the back-end computing platform 202 utilizing the tool-level models for the given software product's given set of software tools to produce (i) a first group of tool-level predictions for the given construction project and (ii) a respective group of tool-level predictions for each of a universe of reference construction projects. To accomplish this, the back-end computing platform 202 may carry out the functionality of blocks 422, 424, and 426 in connection with each software tool in the given set of software tools, and the back-end computing platform 202 may then group the tool-level predictions that are produced for the given con-struction project together into the first group and may group the tool-level predictions that are produced for each respec-tive reference construction project together into a respective group for the respective reference construction project. And in line with the foregoing discussion of the outputs of the tool-level models, each such tool-level prediction that is produced by the tool-level models may comprise one or both of (i) a predicted performance value of the given perfor-mance parameter for the given or reference construction project and/or (ii) a predicted comparison value (e.g., per-centile or quantile value) for the given or reference past construction project.

At block 524, the back-end computing platform may input the first and respective groups of tool-level predictions into the product-level model, which may function to render and output a product-level prediction of the party's performance on the given construction project that is based on the party's usage of the given software tool. In line with the discussion above, this product-level prediction of the party's perfor-mance on the given construction project may comprise one or both of (i) a predicted value of the given performance parameter, which quantifies the performance on the given construction project in terms of a predicted ability to meet a timing goal, a budget goal, or a quality/safety goal, and/or (ii) a predicted comparison value (e.g., percentile or quantile value) that quantifies the party's performance on the given construction project relative to the performance on the reference construction projects.

At block 526, the back-end computing platform 202 may then input the product-level prediction of the party's per-formance into a recommender engine (perhaps along with product-level predictions output by other product-level models) and thereby cause the recommender engine to output one or more recommendations for improving the party's performance on the given construction project by changing how the party uses the given software product (and/or other software products). For example, the recom-mender engine may evaluate the product-level prediction output by the product-level model for the given software product (perhaps along with product-level predictions out-put by other product-level models), and if that product-level prediction indicates that the party's usage of the given software product is not within expectations for the given software product (e.g., based on a target value or range for the given software product), then the recommender engine may generate one or more recommendations for ways to improve usage of the given software product (e.g., based on a list of best practices for using the given software product).

Additionally, the product-level predictions of a set of product-level models may be utilized by a recommender engine to generate insights related to multiple software products. For instance, as one possible implementation, a recommender engine may utilize the product-level predic-tions of the set of product-level models along with target values or ranges for the software products (e.g., best-practice ranges) to determine one or both of (i) the "realized value" of each software product and/or (ii) the "unrealized value" of each software product. In turn, the recommender engine may optionally weight the realized and/or unrealized values determined for each software product and then use the resulting values to identify which one or more software products have the highest or lowest realized value and/or which one or more software products have the highest or lowest unrealized value, which may then form the basis for the recommendations that are presented.

In practice, the recommender engine may comprise a data science model that is configured to output usage recommen-dations for the given software product (and perhaps other software products) based on product-level predictions. For instance, the recommender engine may take the form of a rules-based model or a trained machine-learning model (e.g., a large language model), among other possibilities.

In practice, outputting one or more usage recommenda-tions may take the form of the back-end computing platform 202 causing a client device 204, which is loaded with and running the construction management software application, to present a user of the client device 204 with the one or more usage recommendations via one or more GUI(s) within the construction management software application. In some example implementations, such outputting of the one or more usage recommendations may take the form of a visual notification (e.g., a text box, a visual pop up, a video overlay, a sidebar etc.) that is presented within the construction management software application. Further still, such a visual notification may take the form of a notification that is within (e.g., an overlay, prompt, etc.) or adjacent to (e.g. a sidebar) a specific software tool of the construction management software application and, in some such examples, the one or more usage recommendations may be related to usage of the specific software tool. The one or more usage recommen-dations may take various other forms (e.g., an audible presentation, etc.), as well.

The functionality for utilizing a product-level model in accordance with the present disclosure may take other forms as well.

Referring again to the discussion above, still another aspect of the disclosed technology involves a project-level model that is configured to render project-level predictions of a party's performance on a given construction project, such as the project-level model 140 illustrated in FIG. 1D. The functionality for creating and executing a project-level model in accordance with the present disclosure may take any of various forms For instance, one possible implementation of functional-ity for creating a project-level model in accordance with the present disclosure is illustrated in FIG. 6A. For purposes of illustration, example functionality 600 of FIG. 6A is described as being carried out by the back-end computing platform 202 of FIG. 2, but it should be understood that the example functionality of FIG. 6A may be carried out by any computing platform that is capable of running the software disclosed herein. Further, it should be understood that the example functionality of FIG. 6A is merely described in this manner for the sake of clarity and explanation and that the example functionality may be implemented in various other manners, including the possibility that functions may be added, removed, rearranged into different orders, combined into fewer blocks, and/or separated into additional blocks depending upon the particular embodiment.

Prior to carrying out the functionality 600 of FIG. 6A, the back-end computing platform 202 may define certain parameters for the project-level model that is to be created.

For instance, as one possibility, the back-end computing platform 202 may define a given set of software products and associated software tools that are to form the basis for the project-level model. In this respect, the set of software tools may comprise the entire set of software products that are included as part of the construction management software application, or some subset thereof.

As another possibility, the back-end computing platform 202 may define a given set of metrics that are associated with the given construction project. In this respect, the given set of metrics may comprise any metric that provides insight regarding a party's usage of the construction management software application, including but not limited to any of the example metrics described herein (e.g., the metrics described with reference to the table 315 of FIG. 3B).

As yet another possibility, the back-end computing platform 202 may define how the project-level model will quantify project performance by defining a given performance parameter that quantifies a party's performance on a construction project in terms of the party's predicted ability to meet a timing goal, a budget goal, or a quality/safety goal, among other possibilities.

In practice, the back-end computing platform 202 may define these parameters based on user input that is provided via a client device 204, which may transmit data indicating such user input to the back-end computing platform 202. Further, in practice, the back-end computing platform 202 may be configured to define the parameters for the tool-level models first, then define the parameters for the product-level models based on the parameters that have previously been defined for the tool-level models, and then define the parameters for the project-level model based on the parameters that have been previously defined for the tool-level and product-level models. For example, the back-end computing platform 202 may define the set of metrics for the project-level model to be a superset of the metrics defined for the product-level models (which may themselves be defined based on the metrics defined for the tool-level models). As another example, the back-end computing platform 202 may first define the given performance parameter to be output by the tool-level models, may then define the given set of software products' given performance parameter to be the same as the given performance parameter to be output by the tool-level models, and then may define the given performance parameter for the project-level to be the same as the given performance parameter to be output by the tool-level and product-level models, such that all three types of models quantify performance in the same way. Other examples are possible as well.

Additionally, in advance of carrying out the functionality 600 of FIG. 6A, the back-end computing platform 202 may carry out the functionality 500 of FIG. 5A for each software product in the given set of software products. Thus, as a result of that functionality, the back-end computing platform 202 may have, for each respective software product in the given set of software products, (i) a respective product-level model that was created for the respective software product and (ii) a respective product-level training dataset that was generated based on project data for a common universe of past construction projects (i.e., a collection of past construction projects that was common across the given set of software products) and was thereafter utilized to train the respective product-level model.

The functionality 600 may then begin at block 602, with the back-end computing platform 202 accessing the respective product-level training datasets that were previously generated for the respective software products in the given set of software products.

In line with the discussion above, each of these product-level training datasets may comprise, for each respective past construction project in the common universe of past construction projects, (i) a respective group of tool-level predictions of performance on the respective past construction project that were produced utilizing the tool-level models for the software product's respective set of software tools, (ii) the ground-truth performance parameter value for the past construction project, and (iii) the ground-truth performance comparison value for the past construction project. However, the product-level training datasets may take other forms as well.

It should also be understood that, instead of accessing the respective product-level training datasets that were previously generated for the respective software products in the given set of software products, the back-end computing platform 202 may generate those datasets by carrying out functionality similar to that described with reference to blocks 502, 504, and 506 for each of the software products in the given set of software products.

At block 604, the back-end computing platform 202 may utilize the respective product-level training datasets and the respective product-level models for the given set of software products to generate respective sets of product-level predictions for the past construction projects in the common universe of past construction projects. To accomplish this for a given software product, the back-end computing platform 202 may input the respective group of tool-level predictions for each past construction project into the project-level model, which may function to render and output a respective product-level prediction of performance on the past construction project. The back-end computing platform 202 may repeat this functionality for each software product in the given set of software products, which may produce, for each respective past construction project in the common universe of past construction projects, a respective group of product-level predictions of the performance on the respective past construction project.

At block 606, the back-end computing platform 202 may generate a project-level training dataset for the given construction project that comprises, for each respective past construction project in the common universe of past construction projects, (i) a respective group of product-level predictions of performance on the respective past construction project that were produced utilizing the product-level models for the software products in the given set of software products, (ii) the ground-truth performance parameter value for the past construction project (which was included within the product-level training datasets), and (iii) the ground-truth performance comparison value for the past construction project (which was included within the product-level training datasets). In this respect, in practice, the training data for each respective past construction project may be framed in terms of an "input-label pair" in which (i) the input values comprise the group of product-level predictions of performance on the respective past construction project and (ii) the label values comprise one or both of the ground-truth performance parameter value and/or the ground-truth performance comparison value (e.g., a percentile or quantile value)

At block 608, after generating the project-level training dataset for the project-level model, the back-end computing platform 202 may apply a machine-learning process to the training dataset in order to train at least one machine-learning model that is configured to render and output a project-level prediction of a party's performance on a given construction project that is based on the party's usage of the construction management software application. Such a machine-learning model may take any of various forms.

To begin, the input of the trained machine-learning model may comprise (i) a first group of product-level predictions for the given construction project that are produced by the product-level models for the given set of software products and (ii) a respective group of product-level predictions for each of a universe of reference construction projects that are produced by the product-level models for the given set of software products, where the universe of reference construction projects may comprise any collection of construction projects for which there is available project data that can be utilized to render product-level predictions. And in line with the foregoing discussion of the outputs of the product-level models, each such product-level prediction that is provided as input to the trained machine-learning model may comprise one or both of (i) a predicted value of the given performance parameter for the respective past construction project and/or (ii) a predicted comparison value (e.g., percentile or quantile value) for the respective past construction project.

Further, the output of the trained machine-learning model may comprise, for the given construction project of interest and perhaps also each of the reference construction projects, one or both of (i) a predicted performance value of the given performance parameter, which quantifies the performance on the given or reference construction project in terms of a predicted ability to meet a timing goal, a budget goal, or a quality/safety goal, and/or (ii) a predicted comparison value (e.g., percentile or quantile value) that quantifies the performance on the given or reference construction project relative to the performance on the other construction projects for which data is input to the machine-learning model. The output of the trained machine-learning model may take other forms as well.

Further yet, the machine-learning model that is trained by the machine-learning process may comprise any type of machine-learning model now known or later developed, examples of which may include a regression model, a decision-tree-based model (e.g., a gradient boosting model, random forest model, etc.), SVM-based model, a Bayesian model, a kNN model, a Gaussian process model, a deep learning model (e.g., a feedforward, recurrent, or convolution neural-network model, a GAN model, an autoencoder-based model, a transformer-based model, etc.), a clustering model, an association-rule model, a dimensionality-reduction model, and/or a reinforcement-learning model, among other possible examples of models that can be created using machine-learning techniques.

In some implementations, the back-end computing platform 202 may be configured to train a single machine-learning model of the form described above, in which case that single machine-learning model may be utilized as the project-level model. Alternatively, in other implementations, the back-end computing platform 202 may be configured to train multiple different machine-learning models of the form described above (e.g., utilizing different sets of hyperparameters), in which case the back-end computing platform 202 may then select a given one of those machine-learning models to utilize as the project-level model. To accomplish this, the back-end computing platform 202 may evaluate the performance of the different machine-learning models utilizing a validation dataset (or sometimes referred to as a "test dataset") that has a similar form to the generated training dataset for the project-level model.

Further, in at least some implementations, the back-end computing platform 202 may be configured to periodically re-train the project-level model based on updated training data. For instance, after a given period of time has passed (e.g., a month) and project data for additional past construction projects has become available, the back-end computing platform 202 may be configured to utilize the project data for additional past construction projects to re-train the project-level model.

The functionality for creating project-level models in accordance with the present disclosure may take other forms as well.

Further, while the foregoing functionality is described in the context of creating a project-level model that predicts performance in terms of one given performance parameter, it should be understood that the foregoing functionality may be utilized to create multiple project-level models that are configured to predict performance in terms of multiple different performance parameters, such as (i) a first product-level model that is configured to predict performance in terms of a first performance parameter that quantifies performance in terms of meeting a timing goal, (ii) a second product-level model that is configured to predict performance in terms of a second performance parameter that quantifies performance in terms of meeting a budget goal, and/or (iii) a third product-level model that is configured to predict performance in terms of a third performance parameter that quantifies performance in terms of meeting a quality/safety goal, among various other possibilities.

After the project-level model has been created for the given software product (e.g., via the functionality 600 of FIG. 6A), the project-level model may then be utilized to generate a prediction of a party's performance on a given construction project of interest, which may in turn be utilized to generate one or more insights related to the party's usage of the construction management software application.

One possible implementation of that functionality is illustrated in FIG. 6B. For purposes of illustration, the example functionality 620 of FIG. 6B is described as being carried out by the back-end computing platform 202 of FIG. 2, but it should be understood that the example functionality of FIG. 6B may be carried out by any computing platform that is capable of running the software disclosed herein. Further, it should be understood that the example functionality of FIG. 6B is merely described in this manner for the sake of clarity and explanation and that the example functionality may be implemented in various other manners, including the possibility that functions may be added, removed, rearranged into different orders, combined into fewer blocks, and/or separated into additional blocks depending upon the particular embodiment.

The example functionality 620 may begin at block 622 with the back-end computing platform 202 utilizing the product-level models for the given set of software products to produce (i) a first group of product-level predictions for the given construction project and (ii) a respective group of product-level predictions for each of a universe of reference construction projects. To accomplish this, the back-end computing platform 202 may carry out the functionality of blocks 522 and 524 in connection with each software product in the given set of software products, and the back-end computing platform 202 may then group the product-level predictions that are produced for the given construction project together into the first group and may group the product-level predictions that are produced for each respective reference construction project together into a respective group for the respective reference construction project. And in line with the foregoing discussion of the outputs of the product-level models, each such product-level prediction that is produced by the product-level models may comprise one or both of (i) a predicted performance value of the given performance parameter for the given or reference construction project and/or (ii) a predicted comparison value (e.g., percentile or quantile value) for the given or reference past construction project.

At block 624, the back-end computing platform may input the first and respective groups of product-level predictions into the project-level model, which may function to render and output a project-level prediction of the party's performance on the given construction project that is based on the party's usage of the construction management software application on the given construction project. In line with the discussion above, this project-level prediction of the party's performance on the given construction project may comprise one or both of (i) a predicted value of the given performance parameter, which quantifies the performance on the given construction project in terms of a predicted ability to meet a timing goal, a budget goal, or a quality/safety goal, and/or (ii) a predicted comparison value (e.g., percentile or quantile value) that quantifies the party's performance on the given construction project relative to the performance on the reference construction projects.

At block 626, the back-end computing platform 202 may then input the project-level prediction of the party's performance into a recommender engine and thereby cause the recommender engine to output one or more recommendations for improving the party's performance on the given construction project by changing how the party uses the construction management software application on the given construction project. For example, the recommender engine may evaluate the project-level prediction output by the project-level model, and if that project-level prediction indicates that the party's usage of the construction management software application on the given construction project is not within expectations (e.g., based on a target value or range for the given construction project), then the recommender engine may generate one or more recommendations for ways to improve usage of the construction management software application (e.g., based on a list of best practices for using the construction management software application).

In practice, the recommender engine may comprise a data science model that is configured to output usage recommendations for the construction management software application based on project-level predictions. For instance, the recommender engine may take the form of a rules-based model or a trained machine-learning model (e.g., a large language model), among other possibilities.

In practice, outputting one or more usage recommendations may take the form of the back-end computing platform 202 causing a client device 204, which is loaded with and running the construction management software application, to present a user of the client device 204 with the one or more usage recommendations via one or more GUI(s) within the construction management software application. In some example implementations, such outputting of the one or more usage recommendations may take the form of a graphical overlay (e.g., a text box, a visual pop up, a video overlay, etc.) that is presented within the construction management software application. Further still, such a graphical overlay may take the form of an overlay within a specific software tool of the construction management application, and, in some such examples, the one or more usage recommendations may be related to usage of the specific software tool over which the graphical overlay is presented. The one or more usage recommendations may take various other forms (e.g., an audible presentation, etc.), as well.

The functionality for utilizing a tool-level model in accordance with the present disclosure may take other forms as well.

After the foregoing functionality has been carried out for a set of construction projects associated with a given party, the foregoing predictions may also be utilized to generate certain party-level insights regarding the given party's use of the construction management software application across its construction projects.

For instance, as one possibility, the project-level predictions for the set of construction projects can be input into a party-level data science model that is configured to output a score value that quantifies the party's proficiency in using the construction management software application across its set of construction projects. Such a party-level model may take any of various forms.

For instance, as one possibility, the party-level model may be configured to (i) receive, as input, a set of project-level predictions for a set of construction projects that are (or were) managed by the party utilizing the construction management software application, and (ii) based on an evaluation of the project-level predictions, determine and output a score value that quantifies the party's proficiency in using the construction management software application across the set of construction projects. In this respect, the party-level model may determine the score value by aggregating the project-level predictions across the set of construction projects and then perhaps transforming the aggregated value in some way. For instance, if the project-level predictions comprise project-level percentile values indicating how the party's performance on its construction projects compare to performance on other construction projects, the party-level model may aggregate the project-level percentile values and then either output the aggregated percentile value as the score value or transform the aggregated percentile value into a score value. The party-level model may take other forms and determine the score value in other manners as well.

As another possibility, the disclosed technology for generating a party-level insight may take the form of a data science model that is configured to (i) receive a set of predictions output by a given tool-level model or a given product-level model across multiple construction projects involving a party and (ii) based on an evaluation of the received set of predictions, render and output a score value that quantifies the party's proficiency in using the given software tool or the given software product across its set of construction projects.

As yet another possibility, the disclosed technology for generating a party-level insight may take the form of a data science model that is configured to (i) receive sets of predictions output by a set of metric-level models, a set of tool-level models, or a set of product-level models across multiple construction projects involving a party and (ii) based on an evaluation of the received set of predictions, render and output a usage recommendation for the construction management software application, which may any of various forms.

For example, if a data science model is configured to receive sets of metric-level predictions across the multiple construction projects involving the party, the data science model may be configured output a recommendation for using the software tools of the construction management software application in a more proficient way that includes an identification of which one or more software tools are most negatively impacting performance and/or present the most opportunity for improving performance if used in a more proficient way, an identification of which tool usage behaviors are most negatively impacting performance and/or present the most opportunity for improving performance if such behaviors are changed, and/or a suggestion for how to use one or more software tools in a more proficient way (e.g., by changing tool usage behavior).

As another example, if a data science model is configured to receive sets of tool-level predictions across the multiple construction projects involving the party, the data science model may be configured output a recommendation for using the software tools of the construction management software application in a more proficient way that includes an identification of which one or more software tools are most negatively impacting performance and/or present the most opportunity for improving performance if used in a more proficient way.

As yet another example, if a data science model is configured to receive sets of product-level predictions across the multiple construction projects involving the party, the data science model may be configured output a recommendation for using the software tools of the construction management software application in a more proficient way that includes an identification of which one or more software products are most negatively impacting performance and/or present the most opportunity for improving performance if used in a more proficient way.

As a further possibility, the disclosed technology may utilize a party-level score value as a basis for deriving another insight related to the party's usage of the construction management software application. For example, the party's score value may be input into a party-level recommender engine, which uses the party's score value as a basis for generating and outputting one or more party-level recommendation(s) for improving the party's usage of the construction management software application. In practice, the recommender engine may comprise a data science model that is configured to output usage recommendations for the construction management software application based on party-level scores. For instance, the recommender engine may take the form of a rules-based model or a trained machine-learning model (e.g., a large language model), among other possibilities.

As another example, the party's score value may be utilized as a basis for comparing the party's proficiency in using the construction management software application against other parties' proficiency in using the construction management software application, such as by generating a ranking of the party's proficiency in using the construction management software application.

In line with the foregoing discussion, the party-level insights described above may also be produced for any of multiple different types of performance parameters (e.g., a first performance parameter based on timing, a second performance parameter based on budget, a third performance parameter based on quality/safety), etc. Additionally, in some implementations, the party-level scores that are produced for multiple different types of performance parameters may be aggregated together in some manner.

The functionality for utilizing a party-level model in accordance with the present disclosure may take other forms as well.

In line with the discussion above the discussion above, the tool-level, product-level, and project-level models disclosed herein may be connected together into a model hierarchy in which the outputs of the tool-level models serve as inputs to a product-level model and the outputs of the product-level models serve as inputs to a project-level model. A simplified example of one possible example of such a model hierarchy is shown in FIGS. 7A-7B.

Figure 7A:
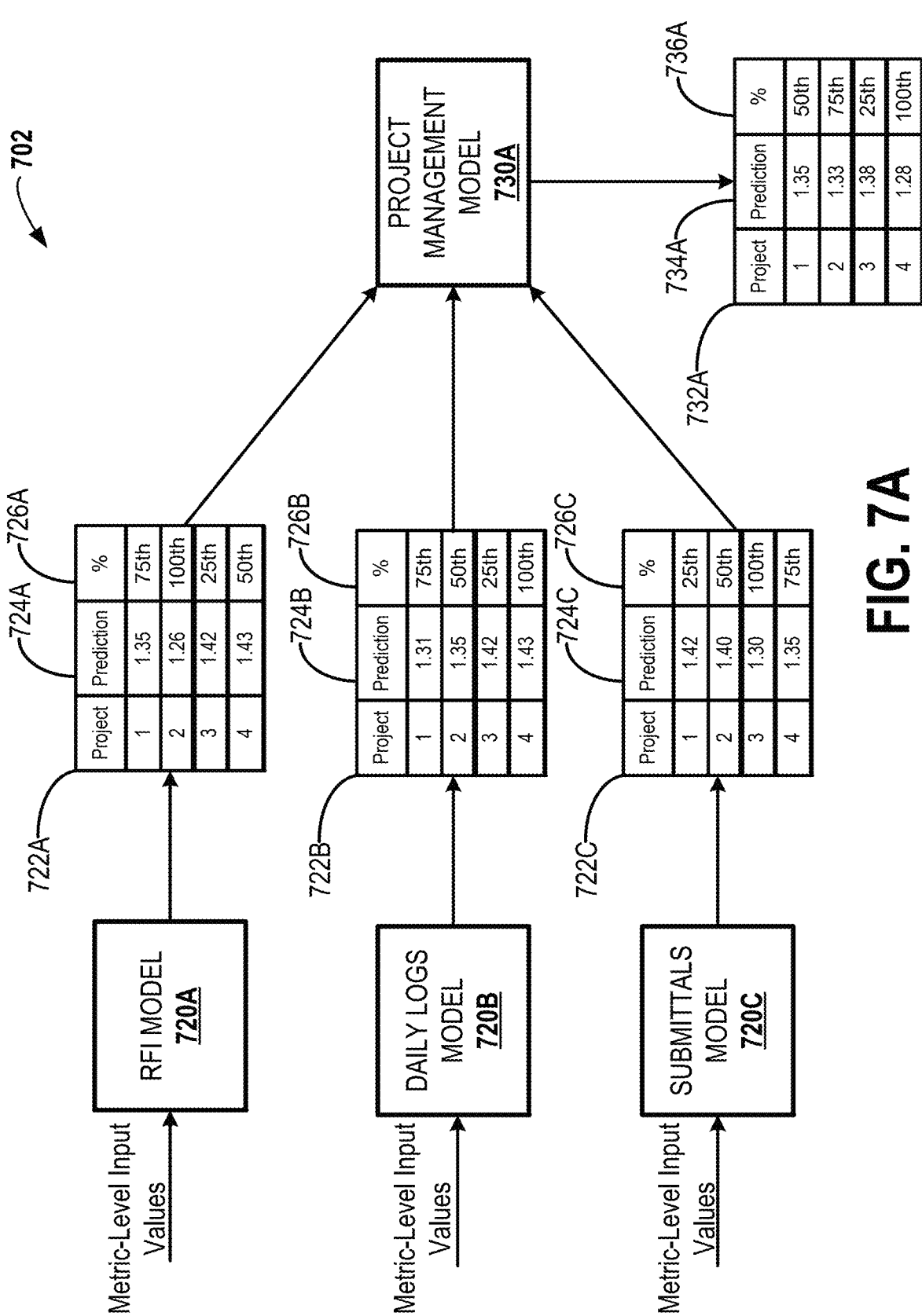
FIG. 7A is a block diagram illustrating the hierarchical interconnection between a representative set of tool-level models and a representative product-level model.
Figure 7B:
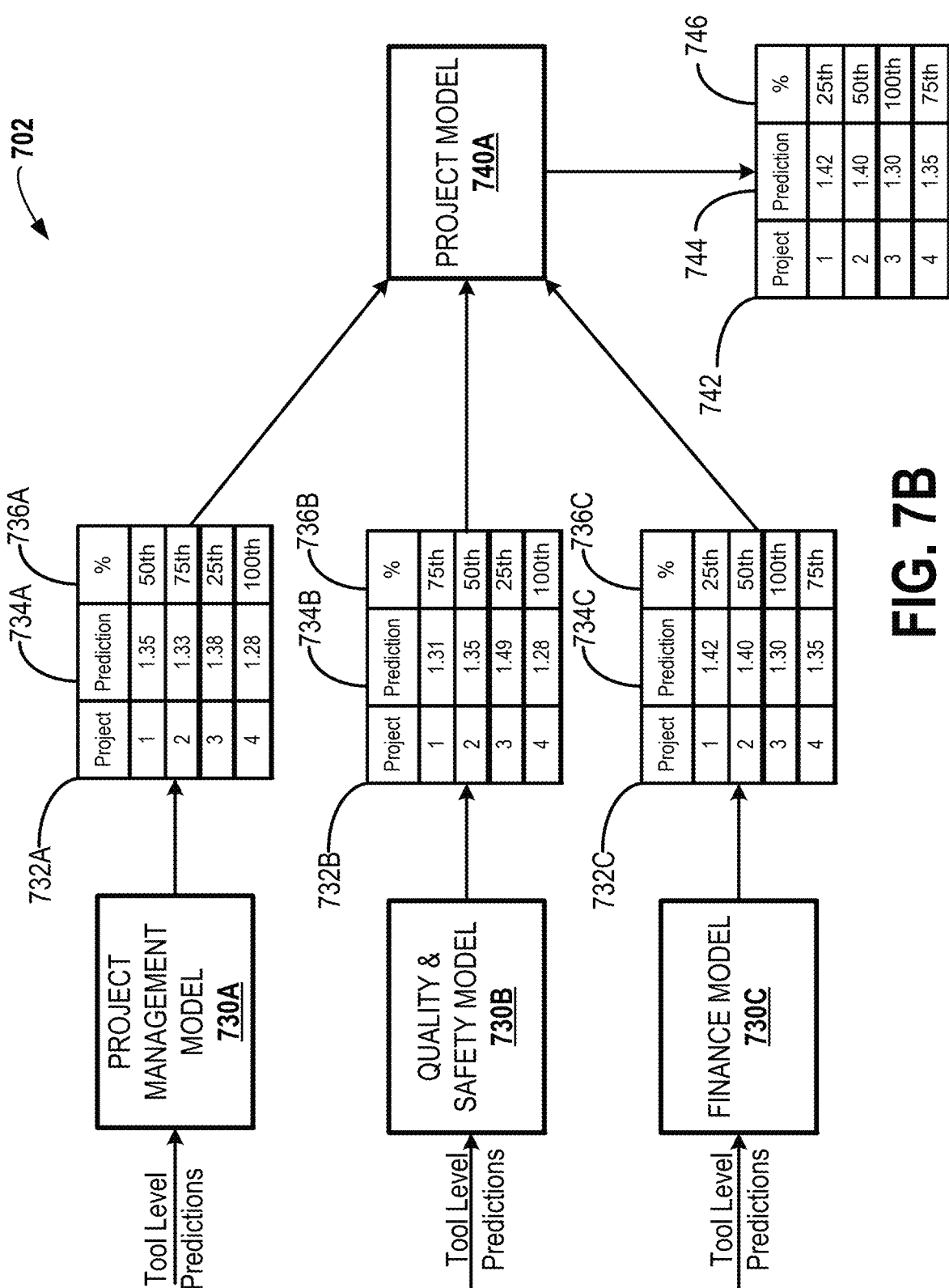
FIG. 7B is a block diagram illustrating the hierarchical interconnection between a representative set of product-level models and a representative project-level model.

Beginning with FIG. 7A, the interconnection between a representative set of tool-level models and a representative product-level model is shown. In particular, the representative set of tool-level models is shown to include an RFIs model 720A for an RFIs software tool, a daily logs model 720B for a Daily Logs software tool, and a submittals model 720C for a Submittals software tool, and the representative product-level model is shown to be a project management model 730A for a Project Management software product that includes the RFIs, Daily Logs, and Submittals software tools.

As illustrated, each of the tool-level models may output a respective tool-level prediction 722 of performance on each of multiple construction projects for which metric-level input values (e.g., metric values or metric-level predictions) are provided as input to the tool-level model, which may include one given construction project of interest (e.g., Project #1) along with a universe of reference projects (e.g., Projects #2-4). Further, the respective tool-level prediction 722 of performance on each of the construction projects may comprise (i) a predicted performance value 724 that quantifies performance on the construction project in terms of a predicted ability to meet a timing goal, a budget goal, or a quality/safety goal, such as a ratio of predicted versus planned number of days to complete a project, a ratio of predicted versus planned spend on a project, or a ratio of predicted versus planned number of safety incidents on a project, and (ii) a predicted comparison value 726 that quantifies the performance on the construction project relative to the performance on the other construction projects, such as a percentile or quantile value.

As illustrated, the tool-level predictions 722 output by the tool-level models (e.g., one or both of the predicted performance values 724 and/or the predicted comparison values 726) are utilized, as input, by the project management model 730A, to render and output a product-level prediction 732 of performance on each of the construction projects. As with the tool-level predictions 722, this product-level prediction 732 of performance on each of the construction projects is shown to include (i) a predicted performance value 734 that quantifies performance on the construction project in terms of a predicted ability to meet a timing goal, a budget goal, or a quality/safety goal, such as a ratio of predicted versus planned number of days to complete a project, a ratio of predicted versus planned spend on a project, or a ratio of predicted versus planned number of safety incidents on a project, and (ii) a predicted comparison value 736 that quantifies the performance on the construction project relative to the performance on the other construction projects, such as a percentile value.

Turning next to FIG. 7B, the interconnection between a representative set of product-level models and a representative project-level model is shown. In particular, the representative set of product-level models is shown to include the project management model 730A of FIG. 7A, a quality & safety model 730B for a quality & safety software product, and a finance model 730C for a finance software product—each of which includes a respective set of software tools—and the representative project-level model is shown as project model 740A.

As illustrated, each of the product-level models may output a respective product-level prediction 732 of performance on each of the multiple construction projects that were evaluated using the tool-level models. Further, the respective product-level prediction 732 of performance on each of the construction projects may comprise (i) a predicted performance value 734 that quantifies performance on the construction project in terms of a predicted ability to meet a timing goal, a budget goal, or quality/safety goal, such as a ratio of predicted versus planned number of days to complete a project, a ratio of predicted versus planned spend on a project, or a ratio of predicted versus planned number of safety incidents on a project, and (ii) a predicted comparison value 736 that quantifies the performance on the respective construction project relative to the performance on the other construction projects, such as a percentile or quantile value.

As illustrated, the product-level predictions 732 output by the product-level models (e.g., one or both of the predicted performance values 734 and/or the predicted comparison values 736) are utilized, as input, by the project model 740, to render and output a project-level prediction 742 of performance on each of the construction projects. As with the tool-level predictions 722 and the product-level predictions 732, this project-level prediction 742 of performance on each of the construction projects is shown to include (i) a predicted performance value 744 that quantifies performance on the construction project in terms of a predicted ability to meet a timing goal, a budget goal, or a quality/safety goal, such as a ratio of predicted versus planned number of days to complete a project, a ratio of predicted versus planned spend on a project, or a ratio of predicted versus planned number of safety incidents on a project, and (ii) a predicted comparison value 746 that quantifies the performance on the respective construction project relative to the performance on the other construction projects, such as a percentile or quantile value.

In at least some implementations, this example model hierarchy may be utilized to render project-level predictions for multiple construction projects involving the same party, and such project-level predictions may then be fed into a party-level model (not shown) in order to produce party-level insights for the party.

The disclosed technology for predicting how a party's usage of a construction management software application may impact its performance on a construction project and then utilizing such predictions to derive insights regarding the party may take various other forms as well.

Figure 8:
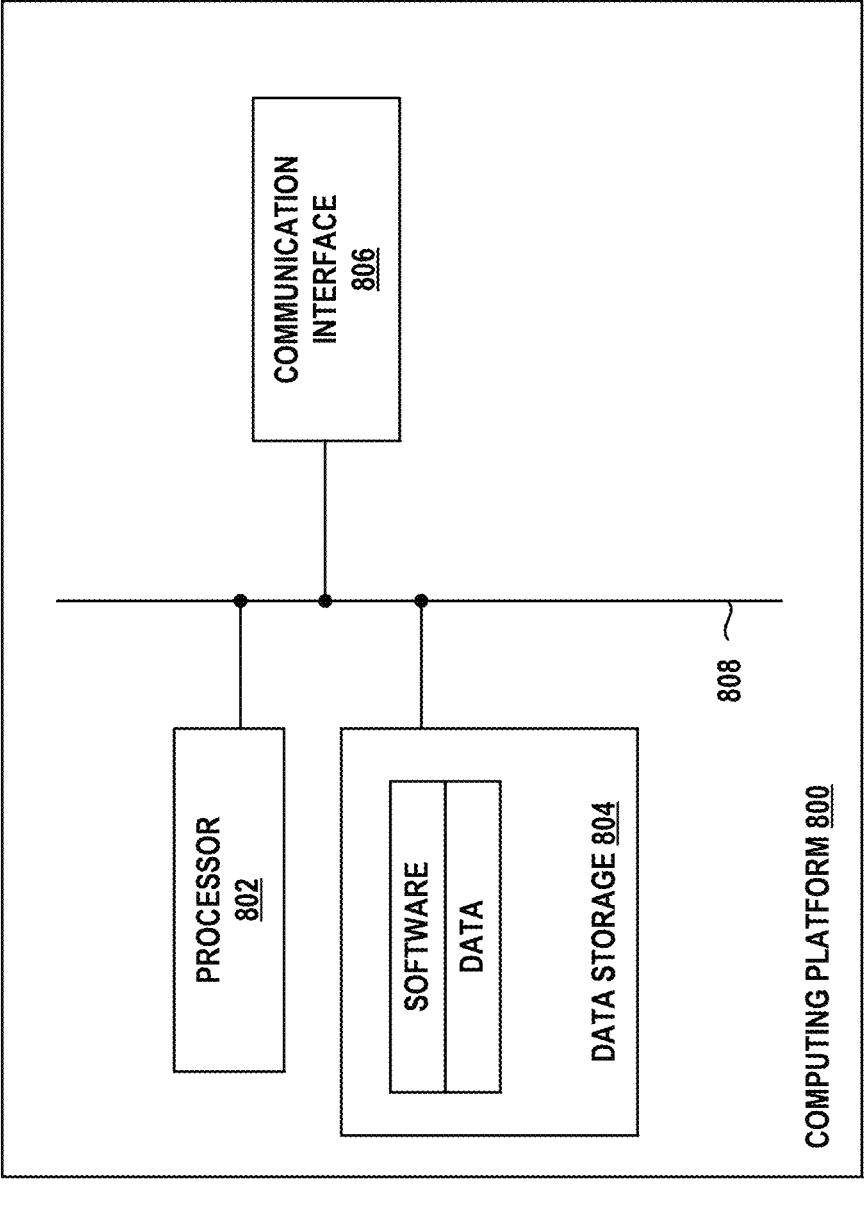
FIG. 8 is a simplified block diagram illustrating some structural components that may be included in an example computing platform that may be configured to perform some or all of the server-side functions disclosed herein.

Turning now to FIG. 8, a simplified block diagram is provided to illustrate some structural components that may be included in an example computing platform 800 that may be configured to perform the platform-side functions disclosed herein. At a high level, the example computing platform 800 may generally comprise any one or more computer systems (e.g., one or more servers) that collectively include one or more processors 802, data storage 804, and one or more communication interfaces 806, each of which may be communicatively linked by a communication link 808 that may take the form of a system bus, a communication network such as a public, private, or hybrid cloud, or some other connection mechanism. Each of these components may take various forms.

For instance, the one or more processors 802 may comprise one or more processor components, such as one or more central processing units (CPUs), graphics processing units (GPUs), application-specific integrated circuits (ASICs), digital signal processor (DSPs), and/or programmable logic devices such as field programmable gate arrays (FPGAs), among other possible types of processing components. In line with the discussion above, it should also be understood that the one or more processors 802 could comprise processing components that are distributed across a plurality of physical computing devices connected via a network, such as a computing cluster of a public, private, or hybrid cloud.

In turn, the data storage 804 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that the data storage 804 may comprise computer-readable storage mediums that are distributed across a plurality of physical computing devices connected via a network, such as a storage cluster of a public, private, or hybrid cloud that operates according to technologies such as AWS for Elastic Compute Cloud, Simple Storage Service, etc.

As shown in FIG. 8, the data storage 804 may be capable of storing both (i) program instructions that are executable by the one or more processors 802 such that the example computing platform 800 is configured to perform any of the various functions disclosed herein (including but not limited to any of the server-side functions discussed above), and (ii) data that may be received, derived, or otherwise stored by the example computing platform 800.

The one or more communication interfaces 806 may comprise one or more interfaces that facilitate communication between the example computing platform 800 and other systems or devices, where each such interface may be wired and/or wireless and may communicate according to any of various communication protocols. As examples, the one or more communication interfaces 806 may take include an Ethernet interface, a serial bus interface (e.g., Firewire, USB 3.0, etc.), a chipset and antenna adapted to facilitate any of various types of wireless communication (e.g., Wi-Fi communication, cellular communication, Bluetooth® communication, etc.), and/or any other interface that provides for wireless or wired communication. Other configurations are possible as well.

Although not shown, the example computing platform 800 may additionally have an Input/Output (I/O) interface that includes or provides connectivity to I/O components that facilitate user interaction with the example computing platform 800, such as a keyboard, a mouse, a trackpad, a display screen, a touch-sensitive interface, a stylus, a virtual-reality headset, and/or one or more speaker components, among other possibilities.

It should be understood that the example computing platform 800 is one example of a computing platform that may be used with the examples described herein. Numerous other arrangements are possible and contemplated herein. For instance, in other examples, the example computing platform 800 may include additional components not pictured and/or more or less of the pictured components.

Figure 9:
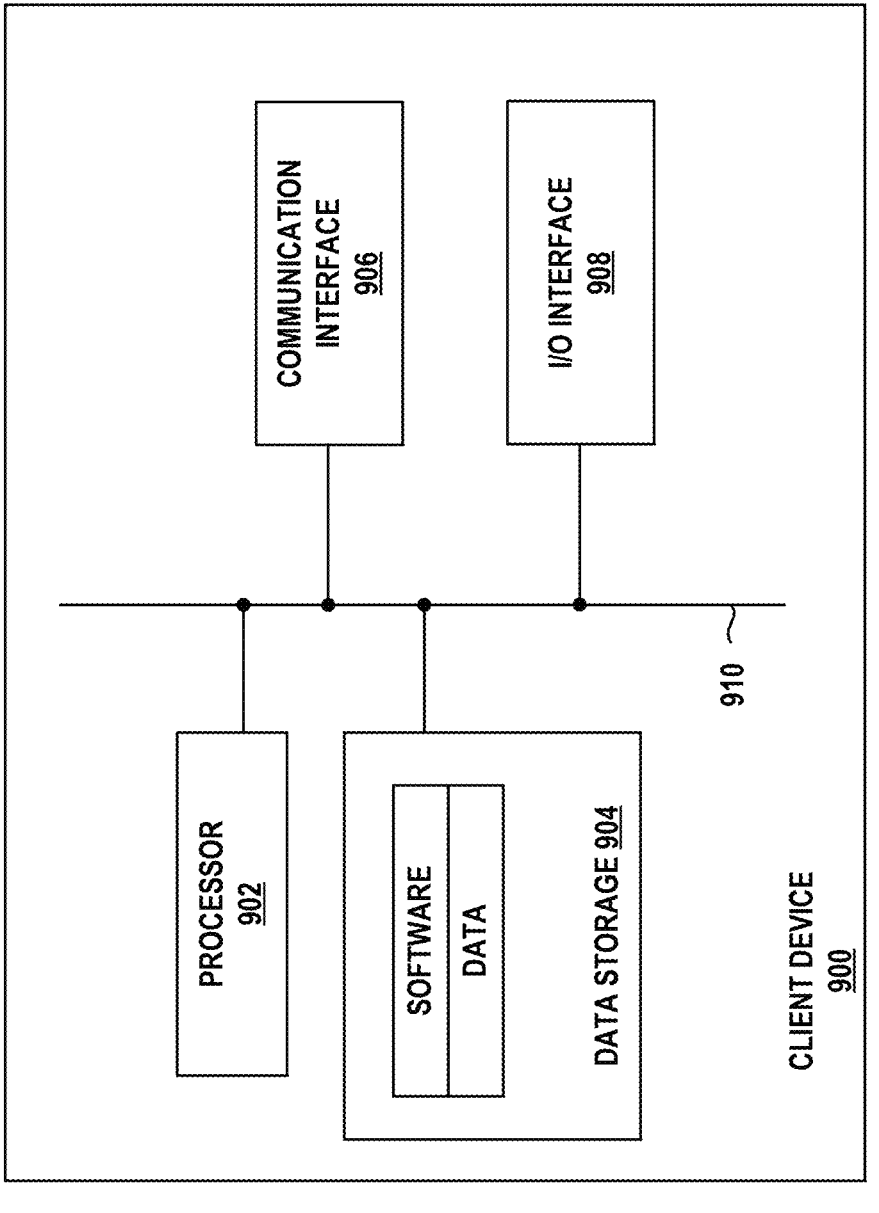
FIG. 9 is a simplified block diagram illustrating some structural components that may be included in an example client device that may be configured to perform some or all of the client-side functions disclosed herein.

Turning next to FIG. 9, a simplified block diagram is provided to illustrate some structural components that may be included in an example client device 900 that may be configured to perform some the client-side functions disclosed herein. At a high level, the example client device 900 may include one or more processors 902, data storage 904, one or more communication interfaces 906, and an I/O interface 908, each of which may be communicatively linked by a communication link 910 that may take the form a system bus and/or some other connection mechanism. Each of these components may take various forms.

For instance, the one or more processors 902 of the example client device 900 may comprise one or more processor components, such as one or more CPUs, GPUs, ASICs, DSPs, and/or programmable logic devices such as FPGAs, among other possible types of processing components.

In turn, the data storage 904 of the example client device 900 may comprise one or more non-transitory computer-readable mediums, examples of which may include volatile storage mediums such as random-access memory, registers, cache, etc. and non-volatile storage mediums such as read-only memory, a hard-disk drive, a solid-state drive, flash memory, an optical-storage device, etc. As shown in FIG. 9, the data storage 904 may be capable of storing both (i) program instructions that are executable by the one or more processors 902 of the example client device 900 such that the example client device 900 is configured to perform any of the various functions disclosed herein (including but not limited to any of the client-side functions discussed above), and (ii) data that may be received, derived, or otherwise stored by the example client device 900.

The one or more communication interfaces 906 may comprise one or more interfaces that facilitate communication between the example client device 900 and other systems or devices, where each such interface may be wired and/or wireless and may communicate according to any of various communication protocols. As examples, the one or more communication interfaces 906 may take include an Ethernet interface, a serial bus interface (e.g., Firewire, USB 3.0, etc.), a chipset and antenna adapted to facilitate any of various types of wireless communication (e.g., Wi-Fi communication, cellular communication, Bluetooth® communication, etc.), and/or any other interface that provides for wireless or wired communication. Other configurations are possible as well.

The I/O interface 908 may generally take the form of (i) one or more input interfaces that are configured to receive and/or capture information at the example client device 900 and (ii) one or more output interfaces that are configured to output information from the example client device 900 (e.g., for presentation to a user). In this respect, the one or more input interfaces of I/O interface may include or provide connectivity to input components such as a microphone, a camera, a keyboard, a mouse, a trackpad, a touchscreen, and/or a stylus, among other possibilities, and the one or more output interfaces of the I/O interface 908 may include or provide connectivity to output components such as a display screen and/or an audio speaker, among other possibilities.

It should be understood that the example client device 900 is one example of a client device that may be used with the examples described herein. Numerous other arrangements are possible and contemplated herein. For instance, in other examples, the example client device 900 may include additional components not pictured and/or more or fewer of the pictured components.

Example embodiments of the disclosed innovations have been described above. Those skilled in the art will understand, however, that changes and modifications may be made to the embodiments described without departing from the true scope and spirit of the present invention, which will be defined by the claims.

Further, to the extent that examples described herein involve operations performed or initiated by actors, such as "humans," "operators," "cusers," or other entities, this is for purposes of example and explanation only. The claims should not be construed as requiring action by such actors unless explicitly recited in the claim language.

We claim:

1. A computing platform comprising:
at least one processor;
at least one non-transitory computer-readable medium; and
program instructions stored on the at least one non-transitory computer-readable medium that, when executed by the at least one processor, cause the computing platform to:
create a data science model that is configured to (i) receive a value for a metric that provides insight regarding a party's usage of a software tool of a construction management software application on a construction project and (ii) based on an evaluation of the received value for the metric, output a prediction of the party's performance on the construction project, wherein the data science model is created by:
obtaining project data for a universe of past construction projects;
for each respective construction project in the universe of past construction projects, utilizing the respective project data for the respective construction project to determine (i) a respective metric value of the metric for the respective construction project and (ii) a respective performance value that quantifies performance on the respective construction project;
partitioning the respective metric values that are determined for the universe of past construction projects into a plurality of discrete ranges of metric values;
for each respective range of metric values in the plurality of discrete ranges of metric values, determining a corresponding performance value that quantifies performance on a construction project having a metric value within the respective range of metric values; and
encoding the plurality of discrete ranges of metric values and corresponding performance values into the data science model;
after creating the data science model, utilize the data science model to produce a prediction of a given party's performance on a given construction project that is based on the given party's usage of the software tool by:
obtaining project data for a given construction project;
based on the obtained project data, determining a given value for the metric; and
inputting the given value for the metric into the data science model and thereby causing the data science model to (i) evaluate the given value of the metric, and (ii) based on the evaluation of the given value, output the prediction of the given party's performance on the given construction project;

based on the prediction of the given party's perfor-
mance on the given construction project, determine
that the given party's usage of the software tool is
negatively impacting the given party's performance
on the given construction project; and in response to the determination that the given party's
usage of the software tool is negatively impacting the
given party's performance on the given construction
project, generate a recommendation for changing
how the software tool is being utilized by the given
party.

2. The computing platform of claim 1, wherein the metric
comprises a first metric, the data science model comprises a
first data science model, and the prediction of the given
party's performance on the given construction project com-
prises a first prediction of the given party's performance on
the given construction project, and wherein the computing
platform further comprises program instructions stored on
the at least one non-transitory computer-readable medium
that, when executed by the at least one processor, cause the
computing platform to:

create a second data science model that is configured to (i)
receive a value for a second metric that provides insight
regarding a party's usage of the software tool on a
construction project and (ii) based on an evaluation of
the received value for the second metric, predict the
party's performance on the construction project; and after creating the second data science model, utilize the
second data science model to produce a second predic-
tion of the given party's performance on the given
construction project that is based on the given party's
usage of the software tool.

3. The computing platform of claim 2, wherein the
determination that the given party's usage of the software
tool is negatively impacting the given party's performance
on the given construction project is further based on the
second prediction.

4. The computing platform of claim 1, wherein the
prediction of the given party's performance on the given
construction project comprises a predicted performance
value that quantifies the given party's performance on the
given construction project.

5. The computing platform of claim 4, wherein the
predicted performance value quantifies the given party's
performance on the given construction project in terms of
the given party's ability to meet one of a timing goal, a
budget goal, a quality goal, or a safety goal.

6. The computing platform of claim 1, wherein the data
science model's evaluation of the given value of the metric
involves:

identifying, from the plurality of discrete ranges of metric
values, a given range of metric values that encompasses
the given value; and identifying a corresponding performance value for the
given range of metric values.

7. The computing platform of claim 1, wherein the
plurality of discrete ranges of metric values comprise quan-
tiles.

8. The computing platform of claim 1, wherein the
universe of past construction projects comprise past con-
struction projects that were managed using the construction
management software application.

9. A non-transitory computer-readable medium having
stored thereon program instructions that, when executed by
at least one processor, cause a computing platform to:

create a data science model that is configured to (i) receive
a value for a metric that provides insight regarding a party's usage of a software tool of a construction
management software application on a construction
project and (ii) based on an evaluation of the received
value for the metric, output a prediction of the party's
performance on the construction project, wherein the
data science model is created by:

obtaining project data for a universe of past construc-
tion projects;

for each respective construction project in the universe
of past construction projects, utilizing the respective
project data for the respective construction project to
determine (i) a respective metric value of the metric
for the respective construction project and (ii) a
respective performance value that quantifies perfor-
mance on the respective construction project;

partitioning the respective metric values that are deter-
mined for the universe of past construction projects
into a plurality of discrete ranges of metric values;

for each respective range of metric values in the
plurality of discrete ranges of metric values, deter-
mining a corresponding performance value that
quantifies performance on a construction project
having a metric value within the respective range of
metric values; and encoding the plurality of discrete ranges of metric
values and corresponding performance values into
the data science model;

after creating the data science model, utilize the data
science model to produce a prediction of a given
party's performance on a given construction project
that is based on the given party's usage of the software
tool by:

obtaining project data for a given construction project;

based on the obtained project data, determining a given
value for the metric; and inputting the given value for the metric into the data
science model and thereby causing the data science
model to (i) evaluate the given value of the metric,
and (ii) based on the evaluation of the given value,
output the prediction of the given party's perfor-
mance on the given construction project;

based on the prediction of the given party's performance
on the given construction project, determine that the
given party's usage of the software tool is negatively
impacting the given party's performance on the given
construction project; and in response to the determination that the given party's
usage of the software tool is negatively impacting the
given party's performance on the given construction
project, generate a recommendation for changing how
the software tool is being utilized by the given party.

10. The non-transitory computer-readable medium of
claim 9, wherein the metric comprises a first metric, the data
science model comprises a first data science model, and the
prediction of the given party's performance on the given
construction project comprises a first prediction of the given
party's performance on the given construction project, and
wherein the non-transitory computer-readable medium also
has stored thereon program instructions that, when executed
by at least one processor, cause the computing platform to:

create a second data science model that is configured to (i)
receive a value for a second metric that provides insight
regarding a party's usage of the software tool on a
construction project and (ii) based on an evaluation of
the received value for the second metric, predict the
party's performance on the construction project; and after creating the second data science model, utilize the second data science model to produce a second prediction of the given party's performance on the given construction project that is based on the given party's usage of the software tool.

11. The non-transitory computer-readable medium of claim 10, wherein the determination that the given party's usage of the software tool is negatively impacting the given party's performance on the given construction project is further based on the second prediction.

12. The non-transitory computer-readable medium of claim 9, wherein the prediction of the given party's performance on the given construction project comprises a predicted performance value that quantifies the given party's performance on the given construction project.

13. The non-transitory computer-readable medium of claim 12, wherein the predicted performance value quantifies the given party's performance on the given construction project in terms of the given party's ability to meet one of a timing goal, a budget goal, a quality goal, or a safety goal.

14. The non-transitory computer-readable medium of claim 9, wherein the data science model's evaluation of the given value of the metric involves:

identifying, from the plurality of discrete ranges of metric values, a given range of metric values that encompasses the given value; and identifying a corresponding performance value for the given range of metric values.

15. The non-transitory computer-readable medium of claim 9, wherein the plurality of discrete ranges of metric values comprise quantiles.

16. The non-transitory computer-readable medium of claim 9, wherein the universe of past construction projects comprise past construction projects that were managed using the construction management software application.

17. A method implemented by a computing platform, the method comprising:

creating a data science model that is configured to (i) receive a value for a metric that provides insight regarding a party's usage of a software tool of a construction management software application on a construction project and (ii) based on an evaluation of the received value for the metric, output a prediction of the party's performance on the construction project, wherein the data science model is created by:

obtaining project data for a universe of past construction projects;

for each respective construction project in the universe of past construction projects, utilizing the respective project data for the respective construction project to determine (i) a respective metric value of the metric for the respective construction project and (ii) a respective performance value that quantifies performance on the respective construction project;

partitioning the respective metric values that are determined for the universe of past construction projects into a plurality of discrete ranges of metric values;

for each respective range of metric values in the plurality of discrete ranges of metric values, determining a corresponding performance value that quantifies performance on a construction project having a metric value within the respective range of metric values; and encoding the plurality of discrete ranges of metric values and corresponding performance values into the data science model;

after creating the data science model, utilizing the data science model to produce a prediction of a given party's performance on a given construction project that is based on the given party's usage of the software tool by:

obtaining project data for a given construction project;

based on the obtained project data, determining a given value for the metric; and inputting the given value for the metric into the data science model and thereby causing the data science model to (i) evaluate the given value of the metric, and (ii) based on the evaluation of the given value, output the prediction of the given party's performance on the given construction project;

based on the prediction of the given party's performance on the given construction project, determining that the given party's usage of the software tool is negatively impacting the given party's performance on the given construction project; and in response to the determination that the given party's usage of the software tool is negatively impacting the given party's performance on the given construction project, generating a recommendation for changing how the software tool is being utilized by the given party.

18. The method of claim 17, wherein the metric comprises a first metric, the data science model comprises a first data science model, and the prediction of the given party's performance on the given construction project comprises a first prediction of the given party's performance on the given construction project, and wherein the method further comprises:

creating a second data science model that is configured to (i) receive a value for a second metric that provides insight regarding a party's usage of the software tool on a construction project and (ii) based on an evaluation of the received value for the second metric, predict the party's performance on the construction project; and after creating the second data science model, utilizing the second data science model to produce a second prediction of the given party's performance on the given construction project that is based on the given party's usage of the software tool.

19. The method of claim 18, further comprising: wherein the determining that the given party's usage of the software tool is negatively impacting the given party's performance on the given construction project is further based on the second prediction.

20. The method of claim 17, wherein the prediction of the given party's performance on the given construction project comprises a predicted performance value that quantifies the given party's performance on the given construction project.

* * * * *